(12) United States Patent
Shibuya et al.

(10) Patent No.: US 7,919,203 B2
(45) Date of Patent: Apr. 5, 2011

(54) BATTERY BOX STRUCTURE, INTER-LOCKING STRUCTURE OF ELECTRICAL EQUIPMENT BOX, AND ELECTRICAL EQUIPMENT BOX STRUCTURE

(75) Inventors: Kentaro Shibuya, Shioya-gun (JP); Hiroshi Kosaka, Utsunomiya (JP); Keishi Kousaka, Sakura (JP); Koichi Hasegawa, Utsunomiya (JP); Seiichi Sato, Hitachinaka (JP)

(73) Assignee: Honda Motor Co., Ltd., Tokyo (JP)

( * ) Notice: Subject to any disclaimer, the term of this patent is extended or adjusted under 35 U.S.C. 154(b) by 965 days.

(21) Appl. No.: 11/664,699

(22) PCT Filed: Oct. 7, 2005

(86) PCT No.: PCT/JP2005/018640
§ 371 (c)(1),
(2), (4) Date: May 11, 2007

(87) PCT Pub. No.: WO2006/041034
PCT Pub. Date: Apr. 20, 2006

(65) Prior Publication Data
US 2007/0259263 A1    Nov. 8, 2007

(30) Foreign Application Priority Data

Oct. 8, 2004    (JP) .............................. P2004-296578
Oct. 8, 2004    (JP) .............................. P2004-296579
Feb. 25, 2005    (JP) .............................. P2005-051621
Feb. 25, 2005    (JP) .............................. P2005-051622

(51) Int. Cl.
*H01M 2/10*    (2006.01)
(52) U.S. Cl. ............. 429/99; 429/97; 429/149; 429/186
(58) Field of Classification Search ................... 429/96, 429/97, 99, 100, 120, 186, 149, 151
See application file for complete search history.

(56) References Cited

FOREIGN PATENT DOCUMENTS

| GB | 1 386 025 | 3/1975 |
|---|---|---|
| JP | 06-084434 | 3/1994 |
| JP | 10-64495 A | 3/1998 |
| JP | 10-255738 | 9/1998 |
| JP | 10-270006 | * 10/1998 |
| JP | 11-045691 A | 2/1999 |
| JP | 2002-175791 A | 6/2002 |
| JP | 2003-152378 | 5/2003 |
| JP | 2004-71394 | 3/2004 |

* cited by examiner

*Primary Examiner* — Raymond Alejandro
(74) *Attorney, Agent, or Firm* — Arent Fox LLP

(57) ABSTRACT

A battery box structure includes a battery module, a holding frame which holds the battery module, a case which is made from expanded insulating resin and which stores the holding frame, and an elastic member secured to the holding frame and arranged between the battery module and the case, wherein the elastic member includes an upper wall and flanges extending from both side edges of the upper wall, and wherein a distance between the flanges is substantially the same as a width of a protrusion of the holding frame for securing the elastic member to the holding frame.

17 Claims, 18 Drawing Sheets

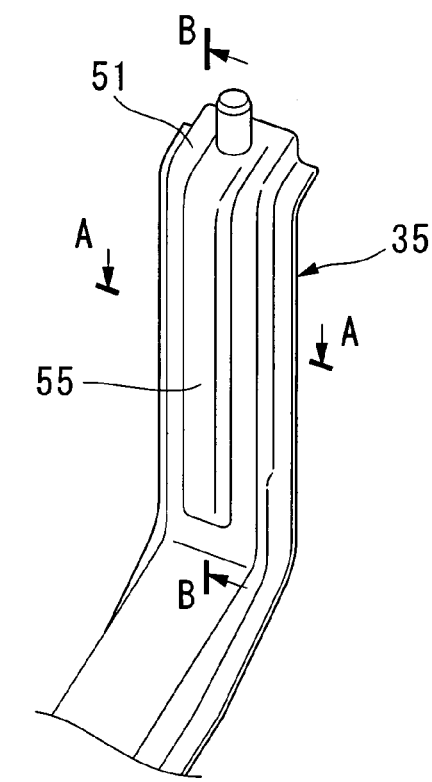
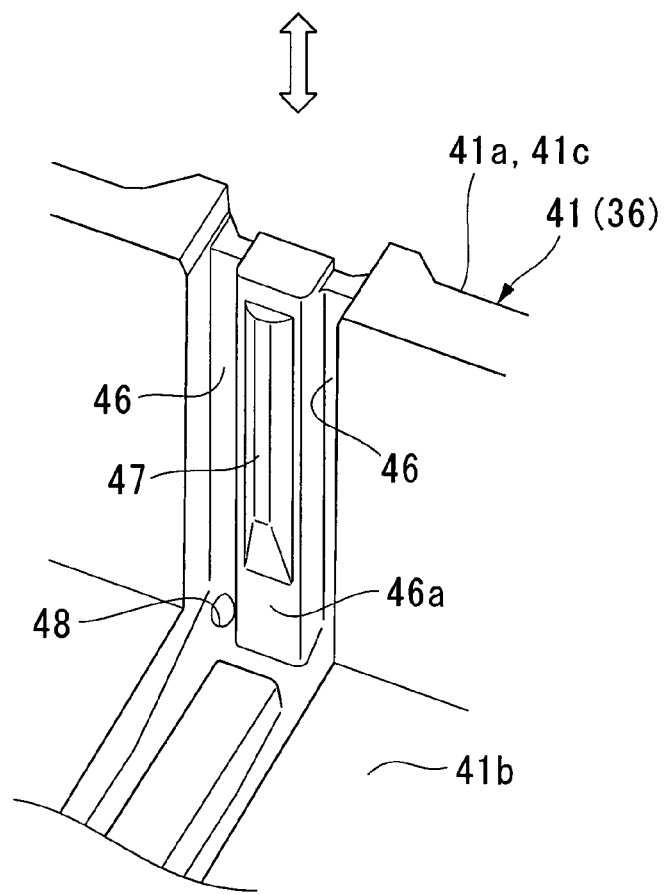
FIG. 7

_US 7,919,203 B2_

BATTERY BOX STRUCTURE, INTER-LOCKING STRUCTURE OF ELECTRICAL EQUIPMENT BOX, AND ELECTRICAL EQUIPMENT BOX STRUCTURE

CROSS-REFERENCE TO RELATED APPLICATION

This application is a National Stage entry of International Application No. PCT/JP2005/018640, filed Oct. 7, 2005, the entire specification claims and drawings of which are incorporated herewith by reference.

TECHNICAL FIELD

The present invention relates to a battery box structure at which a battery module is stored in a case, an inter-locking structure of an electrical equipment box at which an energy storage unit including a battery module or the like in a case, and an electrical equipment box structure.

Priority is claimed on Japanese Patent Application Nos. 2004-296578 and 2004-296579, filed Oct. 8, 2004 and Japanese Patent Application Nos. 2005-51621 and 2005-51622, filed Feb. 25, 2005, the contents of which are incorporated herein by reference.

BACKGROUND ART OF THE INVENTION

Conventionally, as a battery box applied to hybrid vehicles or the like, there is a type in which a plurality of battery modules that are integrally supported by a support frame are stored in a case (for example, refer to Patent Document 1). In the battery box, each the battery module is cooled down by air circulating in the case.

Conventionally, as an inter-locking structure of an electrical equipment box at which an energy storage unit such as a battery module is stored in a case (i.e., a battery box), there is a type which has an initial inter-locking structure which pulls an interlock wire in accordance with the open/close state of a power supply switch and a driven inter-locking structure which operates a prescribed lock operation in accordance with the state of the interlock wire (for example, refer to Patent Document 2).

[Patent Document 1] Japanese Unexamined Patent Application, First Publication No. 2003-152378
[Patent Document 2] Japanese Unexamined Patent Application, First Publication No. H06-84434

DISCLOSURE OF INVENTION

Problems to be Solved by the Invention

In order to improve vehicles applicability, it is necessary for the above battery boxes to improve the cooling performance of the battery modules in order to arrange each module in proximity (i.e., downsizing the battery box), to reduce the assembly process in order to reduce the cost, and to prevent the occurrence of noise due to looseness of the battery modules in the case.

Therefore, the present invention provides a battery box structure which can make the battery box small, reduce the cost, and prevent noise from occurring due to the looseness.

In addition, since two types of the inter-locking structures and an inter-locking wire connecting them are necessary for the above inter-locking structure, a large number of the parts are necessary and the structure is therefore complicated. Therefore, increases of the cost, weight, and failure probability are a concern, and are desired to be improved. In addition, a structure which can prevent malfunction of the power supply switch when the prescribed lock is released is also desired.

In addition, the above electrical equipment box, which is considered to be applied to the hybrid vehicle or the like, is desired to have an efficient layout of the large power supply switch and a constitution in which the operation of the switch is simple in order to improve vehicle applicability.

Therefore, the present invention intends to reduce the cost, weight, and failure probability by simplifying the structure, and provides an inter-locking structure for an electrical equipment box which prevents the malfunction of the power supply switch when the prescribed lock is released. In addition, the present invention provides an electrical equipment box structure which has an efficient layout of the power supply switch and is easy to operate.

Means for Solving the Problem

An electrical equipment box structure of the present invention has: a battery module; a holding frame which holds the battery module; and a case which is formed from expanded insulating resin and in which the holding frame is stored.

According to the present invention, effects of thermal insulation, impact resistance, insulation, weight reduction or the like can be obtained, leakage of noise due to looseness from inside the case can be prevented, and a duct for cooling air in the battery can easily be formed in the case.

It is preferable that the opposing portion which is opposed to a connection of the battery module in the case be divisibly constituted.

According to this constitution, lines can be connected in a state of the battery modules being stored in the case.

It is preferable that the case be constituted from a plurality of divided bodies which are joined to each other by fitting the protruding and depressed portions thereof.

According to this construction, each of the divided bodies formed from the expanded insulating resin can be closely assembled without gaps.

An electrical equipment box of the present invention includes: a plurality of battery modules; a holding frame which holds the battery modules; a case in which the holding frame is stored; and an elastic member which is arranged between the battery modules.

According to this construction, elastic stress from the elastic member is applied to the battery modules stored in the holding frame, and dimensional deviations accrued by stacking the battery modules can be absorbed. In addition, a gap which is necessary as a cooling air duct between the battery modules can be efficiently used as a space for arranging the elastic member.

It is preferable that the elastic member have a plate-shape body and a plurality of elastic pieces provided on the body.

According to this construction, the space for arranging the elastic member can be reduced, and uniform elastic load can be applied to the battery modules even though the number of parts is small.

A battery box structure of the present invention has: a battery module; a holding frame which holds the battery module; a case in which the frame is stored; and an elastic member which is arranged between the battery module and the holding frame, wherein the elastic member has a body and an elastic piece which is deformed in regard to the body, and wherein the distal end width of the elastic piece is narrower than the proximal end width.

According to the present invention, the elastic load of the elastic member is applied to the battery module held on the holding frame. The load can be absorbed by the yielding of the distal end of the elastic piece when the load to the elastic member is small, and can be absorbed by the yielding of the proximal end of the elastic piece when the load is large.

It is preferable that the elastic member have a plurality of pairs of the elastic pieces, and the pairs of the elastic pieces extend in the opposite direction of each other from the body.

According to this construction, when the elastic member absorbs the load, the force which moves the elastic member along a direction intersecting substantially orthogonal to the deformation stroke of each elastic piece can be offset between the elastic pieces which extend in the opposite direction.

It is preferable that each of the elastic pieces which make a pair be opposed and extended to a piled position on top of each other.

According to this construction, extending lengths of the elastic pieces are increased so that the deformation strokes of the elastic pieces can be increased.

It is preferable that an air induction member be provided between the battery module and the elastic member, which has a plurality of openings and from which air introduced into the case is blown out from the openings toward the battery module.

According to this construction, the air can be blown out throughout the battery modules evenly and all of the battery modules can be cooled. In addition, the elastic force of the elastic member is applied also to the air induction member.

It is preferable that an air induction member be provided between the battery module and the elastic member, which has a plurality of openings and from which air introduced into the case is blown out from the openings toward the battery module.

According to this construction, the air can be blown out throughout the battery modules evenly and all of the battery modules can be cooled.

It is preferable that the air induction member have: a plate-shape body which forms the openings; and a protrusion having an air guide surface which protrudes from the vicinity of the opening of the body toward the battery module and guides the air, so that the air introduced into the case along the body of the air induction member is ventilated, and it is preferable that the air guide surface incline so that the proximal end thereof is positioned higher in a direction of the air circulation than a distal end thereof.

According to this construction, the air ventilated along the air induction member can be smoothly blown along the air guide surface to the battery modules when being introduced via the openings.

It is preferable to provide a jointed portion which is formed near a cathode or an anode of the battery module, and a joining portion which is formed at at least one of the air induction member or the holding frame and is joined to the jointed portion.

According to this construction, the cathode and the anode of the battery modules can be prevented from being inverted by mistake when the battery box is assembled.

The battery box structure of the present invention has: a battery module; a holder and a holding frame which hold the battery module; a case in which the holder and the holding frame are stored; a circular protrusion for positioning which is formed at a periphery of the battery module; and a circular groove which is formed at at least one of the holder or the holding frame and joined to the circular protrusion.

According to the present invention, the battery modules can be easily located when assembling the battery box.

It is preferable that: the battery module have a plurality of single cells which are connected in series; each of the single cells have an outer tube; and a holding portion which holds the outer tube in the vicinity of the circular groove when the circular protrusion and the circular groove are joined.

According to this construction, since the battery modules are held by the outer tubes of the single cells, the load between connections of the single cells can be reduced.

It is preferable that a positioning portion be formed, which decides the relative position in a plurality of directions in at least the case or on an exterior member covering the case.

According to this construction, the battery box and the exterior member can be easily assembled.

A restrainer which restrains the movement of the holding frame separated from the case is preferably formed in at least the case or the holding frame.

According to this construction, the case and the holding frame can be treated as one when assembling the battery box.

It is preferable that a draining hole facing the holding frame be formed on the case.

According to this construction, cooling air can be prevented from leaking out of the case from the draining hole when the air is ventilated into the case and the battery modules are cooled.

An inter-locking structure of the present invention has: an energy storage unit; a case in which the energy storage unit is stored; a power breaker for the energy storage unit; a detachment restrainer which restrains a prescribed member associated with the energy storage unit from being detached from the electrical equipment box; and a working restrainer which restrains the operation of the detachment restrainer in accordance with the state of the power breaker.

According to the present invention, when the power of the energy storage unit is cut off by the energy breaker and a prescribed lock of the detachment restrainer is released, by restraining the operation of the detachment restrainer by the working restrainer, the operation of the power breaker cooperating with the detachment restrainer can be restrained.

It is preferable that the energy storage unit be at least one of a battery, a capacitor, and a fuel cell.

It is preferable that the prescribed member detached from the electrical equipment box be the energy storage unit, or a portion of the energy storage unit, electrical equipment using the energy storage unit, or for utilizing the energy storage, such as an inverter, a downverter, a conducting cable, a junction box or the like.

The prescribed member detached from the electrical equipment box may be a cover which covers the electrical equipment or a cover which covers an output/input terminal of the energy storage unit.

It is preferable that the detachment restrainer have a connector which restrains the detachment of the prescribed member from the electrical equipment box, which is directly connected with the power breaker and which is moved by an on/off operation of the power breaker.

According to this construction, the number of parts of the inter-locking structure can be reduced by directly connecting the power breaker with the detachment restrainer.

It is preferable that the connector be formed from a bar.

According to this construction, since the occupying space of the connector can be reduced, the layout relative to the prescribed member which is detached from the electrical equipment box becomes easy.

It is preferable that the connector restrain the detachment of a fixing member which fixes the prescribed member to the electrical equipment box.

According to this construction, the detachment of the prescribed member from the electrical equipment box can be restrained by a simple structure, for example, restraining tool access to the fixing member such as a bolt.

It is preferable that there be a specific operation of the inter-locking structure that: enables the detachment of the prescribed member from the electrical equipment box by moving the connector when switching the power breaker from ON to OFF; and restrains the detachment of the prescribed member from the electrical equipment box by moving the connector when switching the power breaker from OFF to ON.

It is preferable that the working restrainer be urged toward a working restrain position in regard to the detachment restrainer and restrain the switching from an OFF state to an ON state of the power breaker at the working restrain position.

According to this construction, when the power breaker is an OFF state, i.e., the power supply of the energy storage unit is cut off and the prescribed lock of the detachment restrainer is released, since an urging force is applied to the working restrainer and the operation of the detachment restrainer is automatically restrained, the operation of the power breaker which connects with the detachment restrainer is automatically restrained. Therefore, when the power breaker is switched from this state to an ON state, i.e., a state in which the power source of the energy storage unit is connected, since an operation retracting the working restrainer from the working restrain position against the urging force is necessary, a single malfunction of the power breaker can be prevented.

The electrical equipment box structure of the present invention has a plurality of battery modules; a case in which the battery modules are stored; and a power breaker of the battery modules which is arranged in a battery unarranging portion which is provided at a battery arranging space in which the battery modules can be arranged in the case.

According to the present invention, the battery unarranging portion in the case can be utilized efficiently for arranging space for the power breaker.

It is preferable that: the battery modules constitute a plurality of battery module pair units by aligning a pair of the battery modules orthogonal to an axis thereof; each of the battery module pair units being arranged in the battery arranging space which is substantially a square from an axial view thereof, and odd numbers of the battery modules each being arranged in a length and breadth direction in the axial view. In this case, the battery unarranging portion which is naturally formed in the battery arranging space in the case can be utilized efficiently as an arranging space or the power breaker. The power breaker can be arranged efficiently by using an empty space in the battery arranging space effectively.

It is preferable that the electrical equipment box be mounted behind the back seat in a vehicle, and the power breaker be arranged so as to face the hind surface of the back seat.

According to this construction, the power breaker can be easily accessed from the back seat.

EFFECTS OF THE INVENTION

According to the battery box structure of the present invention, the battery box can be reduced in size, weight, and cost by adding a plurality of functions to the case.

The assembly and maintenance of the battery box can be simplified and the process can be reduced.

The leakage of the cooling air of the battery from the case can be easily and reliably prevented.

The battery modules are held elastically and noise due to the looseness thereof can be prevented. The battery box can be reduced in size and weight even though the elastic member is arranged between the battery modules.

Noise due to the looseness of the battery modules can be prevented by holding the battery modules elastically and flexibly.

The battery modules can be held favorably by preventing the positional deviation of the elastic member while absorbing the load.

The battery modules can be held favorably by increasing the deformation stroke of the elastic piece.

The cooling power of the battery modules can be raised evenly throughout the battery modules. Noise due to looseness of the air induction member can be prevented.

The cooling power of the battery modules can be raised even more.

Assembly of the battery box can be simplified and the process can be reduced.

The load applied to the connections between single cells can be reduced, and further, the battery modules can be held favorably.

The cooling effect of the battery modules can be improved and the battery box size can be reduced.

According to the inter-locking structure of the electrical equipment box, the malfunction of the power breaker can be prevented when the prescribed lock by the detachment restrainer is released.

Cost, weight, and failure probability can be reduced by reducing the number of members in the inter-locking structure and simplifying the structure.

The malfunction of the power breaker can be prevented more reliably when the prescribed lock of the detachment restrainer is released.

According to the electrical equipment box structure of the present invention, the power breaker can be arranged efficiently by utilizing empty space in the battery, thus arranging the space effectively.

The operability of the power breaker can be improved.

BRIEF DESCRIPTION OF DRAWINGS

FIG. 7 is a perspective view showing a principal portion of a holding frame and an insulator of the high-voltage electrical equipment box.

Figure 1:
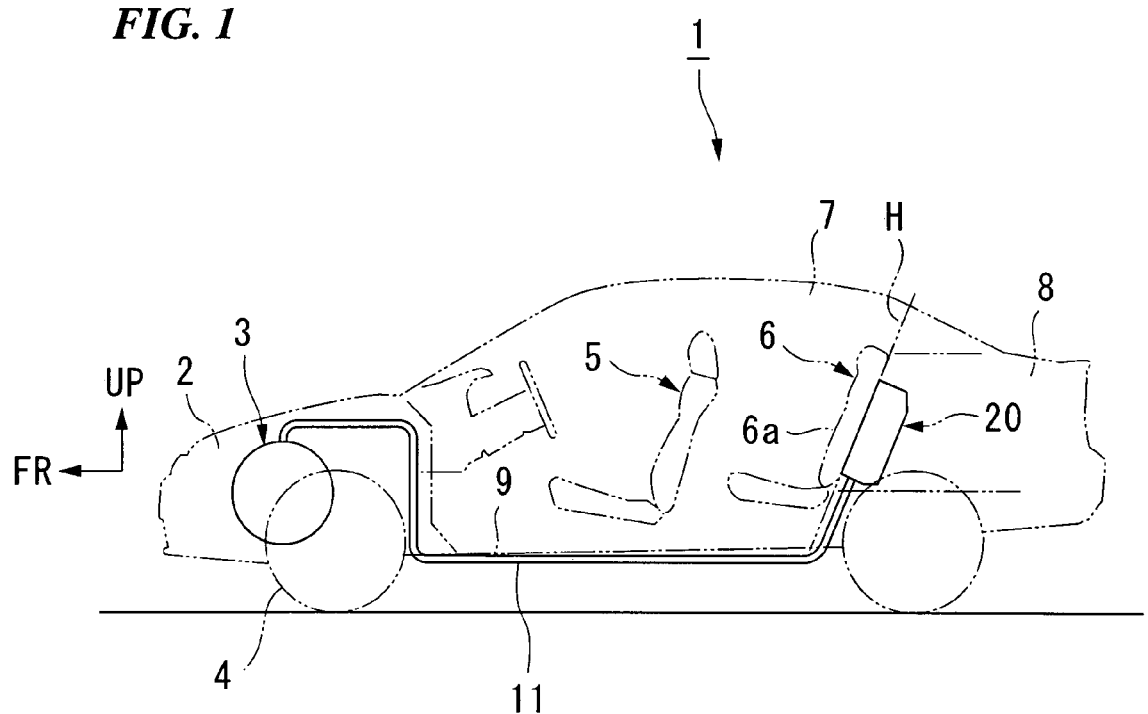
FIG. 1 is a schematic side view showing a hybrid vehicle of an embodiment of the present invention.

BRIEF DESCRIPTION OF THE REFERENCE 1 vehicle
6 back seat
20, 120 high-voltage electrical equipment box (electrical equipment box)
21 exterior case (exterior member)
21a protrusion bead (positioning portion)
22, 122, 125 battery box
22a high-voltage battery (energy storage unit)
23 inverter unit (electrical equipment)
31 battery module
32 single cell
32a outer tube
34 holder
34d holding portion
35 holding frame
36 insulator (case)
37 bus bar plate (wire connection portion)
39a terminal block cover (prescribed member, cover)
39b, 124a bolt (fix member)
41 insulator body (divided body)
42 insulator upper portion (divided body)
43 insulator side portion (divided body)
47 bead (restrainer)
48 draining hole
49 hollow bead (positioning portion)
53 circular protrusion (jointed portion)
54 circular groove (joining portion)
55 frame-side bead (restrainer)
61 separator (air induction member)
62 body
63 opening
64 upper side protrusion (protrusion)
64a air guide surface
65 lower side protrusion (protrusion)
65a air guide surface
71, 171 spring member (elastic member)
72 body
75 elastic piece
81, 181 main switch (power breaker)
83A interlock bar assembly (detachment restrainer)
83, 183 interlock bar (connector)
89 stopper wall (working restrainer)
123 electrical equipment
124 protection cover (prescribed member, cover)
BT battery arrangement space
NB non-battery arrangement portion
H hind surface

BEST MODE FOR CARRYING OUT THE INVENTION

Below, an embodiment of a battery box structure according to the present invention will be explained with drawings. The directions of front, behind, left, and right in the below explanation are identical to the directions of a vehicle unless stated otherwise. An arrow FR denotes the front direction of the vehicle, an arrow LH denotes the left direction of the vehicle, and an arrow UP denotes an upper direction of the vehicle.

A vehicle 1 illustrated in FIG. 1 is a hybrid vehicle. The engine is an internal combustion engine, and the drive thereof is assisted by a motor generator. The kinetic energy of the engine while the vehicle decelerating can be recovered as electrical energy via the motor generator. Recovered electrical energy is charged with an energy storage unit via a power converter.

A power unit 3 constituted by arranging the engine and the motor generator in-line is mounted on an engine room 2 in the front part of the vehicle 1. The driving force of the power unit 3 is transmitted to front wheels 4. A compartment 7 having a front seat 5 and a back seat 6 is provided behind the engine room 2. A trunk room 8 separated from the compartment 7 by a seat back 6a of the back seat 6 or the like is provided behind the compartment 7. A high-voltage electric equipment box 20 connected to the power unit 3 via a power cable 11 beneath a floor 9 is arranged behind the seat back 6a of the back seat 6 (i.e., inside the trunk room 8).

Figure 2:
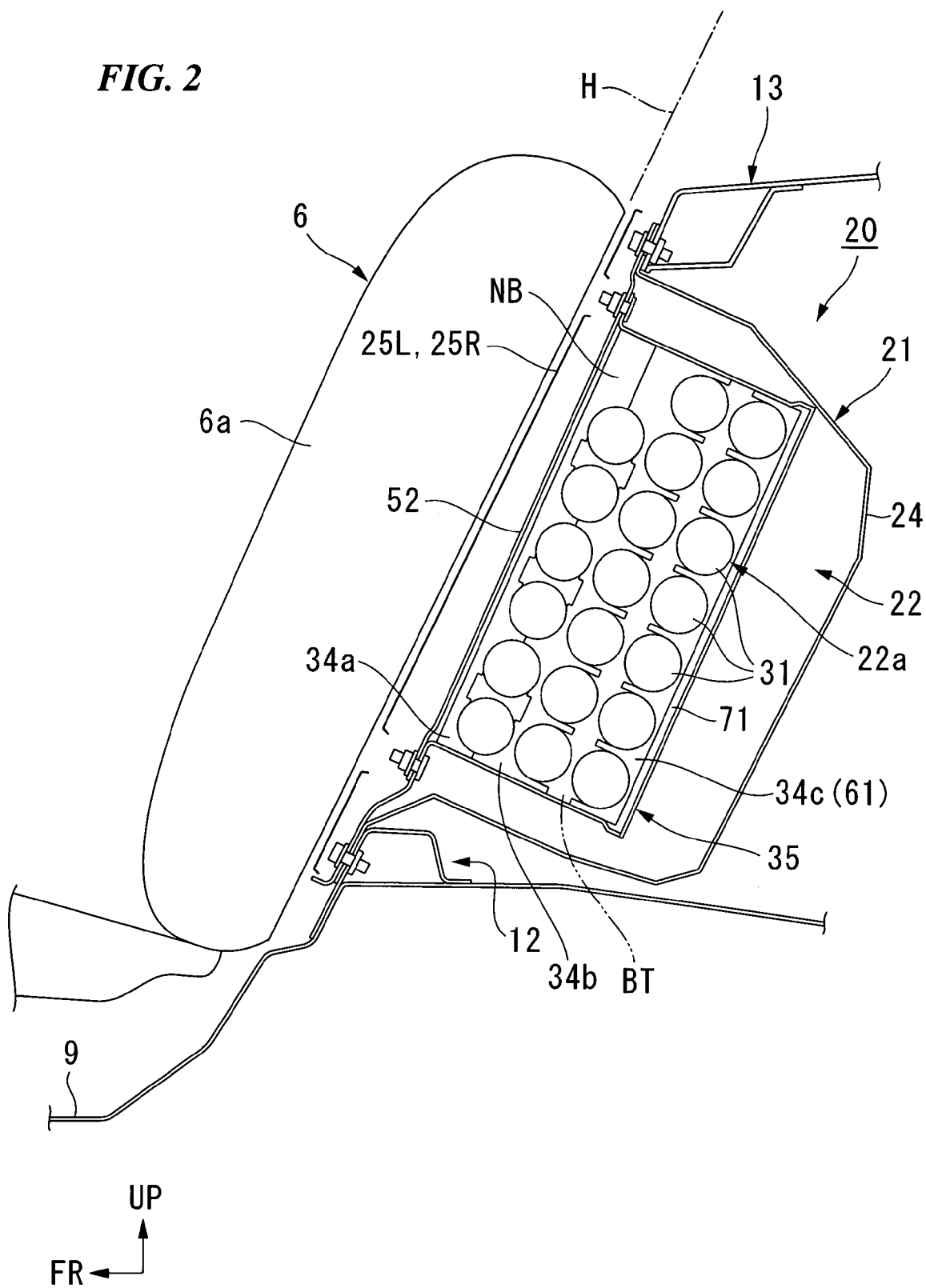
FIG. 2 is a side view showing the vicinity of a high-voltage electrical equipment box mounted on the vehicle.
Figure 3:
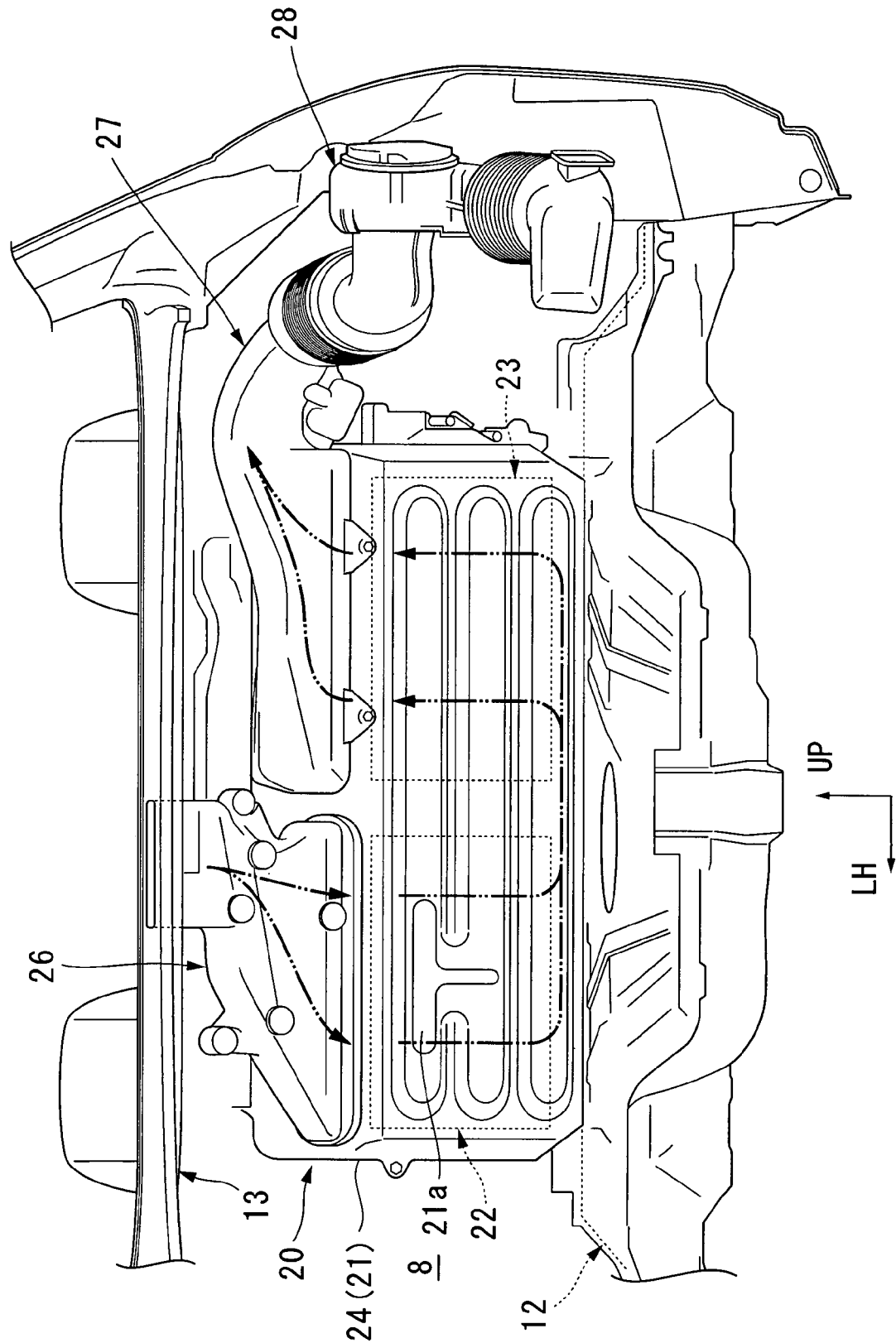
FIG. 3 is a rear view showing the high-voltage electrical equipment box.

As shown in FIGS. 2 and 3, the high-voltage electrical box 2 has electrical equipment such as a box-shaped exterior case (i.e., exterior member) 21, a battery box 22 stored in the exterior case 21, and an inverter unit 23 as the power converter. A high-voltage battery 22a as the energy storage unit is stored in the battery box 22.

The exterior case 21 has a box-shaped case body 24 opening toward the seat back 6a, and a left cover 25L covering the left side of the opening of the case body 24 and a right cover 25R covering the right side of the opening of the case body 24. The exterior case 21 stores the battery box 22 in the left side thereof and the inverter unit 23 in the right side thereof.

The seat back 6a of the back seat 6 is inclined so that the upper portion thereof directs the rearward. The high-voltage electrical equipment box 20 is slantly arranged by a hind surface H of the seat back 6a. The seat back 6a and the high-voltage electrical equipment box 20 are each fixed and supported to a rear cross member 12 as a vehicle skeleton member at the lower parts thereof and to a rear parcel 13 as a skeleton member at the upper parts thereof.

An intake duct 26 which can introduce air in the compartment 7 into the high-voltage electrical equipment box 20 so as to cool the electrical equipment such as the high-voltage battery 22a in the battery box 22 or the inverter unit 23 is mounted on the upper left portion of the high-voltage electrical equipment box 20, and an exhaust duct 27, which can derive air after cooling the electrical equipment is mounted on the upper right portion of the high-voltage electrical equipment box 20. A cooling fan 28 is provided at an intermediate portion of the exhaust duct 27 in order to circulate air in the intake duct 26, the high-voltage electrical equipment box 20, and exhaust duct 27.

Air introduced from the intake duct 26 into the high-voltage electrical equipment box 20 flows downward while cooling the high-voltage battery 22a inside the battery box 22 at the left side of the high-voltage electrical equipment box 20, moves to the right side at the lower end portion of the high-voltage electrical equipment box 20, and flows upward while cooling the inverter unit 23. Then, the air is derived outside the high-voltage electrical equipment box 20 via the exhaust duct 27 and released to the inside of the trunk room 8 or the outside of the vehicle. This air flow is shown by chain line arrows in FIG. 3.

Figure 4:
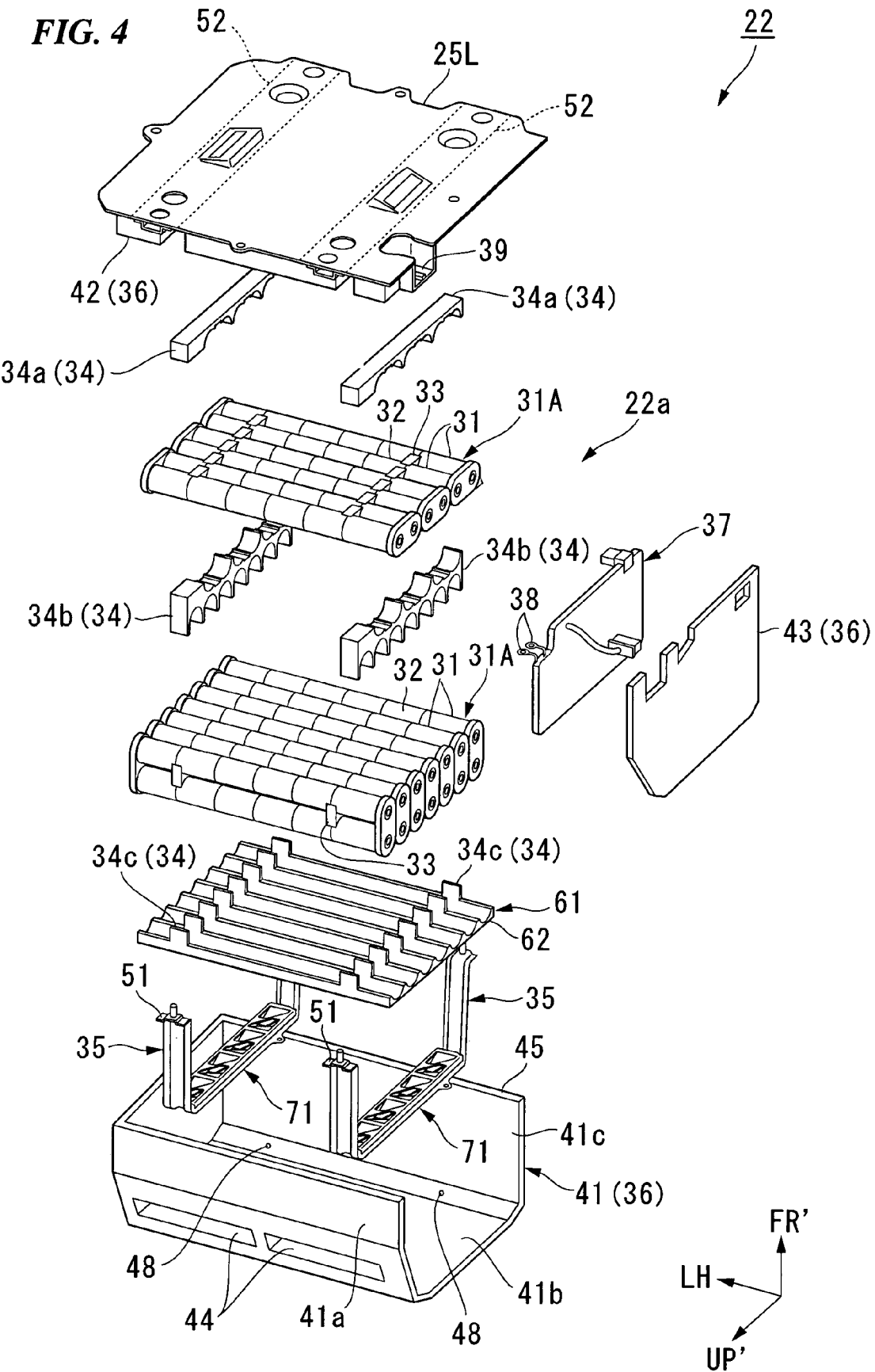
FIG. 4 is a perspective assembly view showing the battery box arranged in the high-voltage electrical equipment box.

FIG. 4 is an exploded perspective view of the battery box 22. As shown in this figure, the battery box 22 holds a plurality of battery modules 31 integrally by each pair of holders 34 and holding frame 35 at the left and right side, and stores them in an insulator (i.e., case) 36 formed from expanded insulating resin (i.e., polystyrene, rubber, polyurethane, or the like). The reason for the insulator 36 being made from expanded resin is weight reduction considering the protection and thermal insulation of each battery modules 31. In the drawings, an arrow UP' denotes the upward direction along the inclination of the hind surface H (i.e., direction along the inclination of the high-voltage electrical equipment box 20), and an arrow FR' denotes the forward direction orthogonal to the hind surface H (i.e., thickness direction of the high-voltage electrical equipment box 20).

Each battery module 31 is formed into a rod-shape by connecting a plurality of (here, six) column-shaped single cells 32 electrically and mechanically in series. In this embodiment, two battery modules 31 are arranged so as to alternate their anodes and the cathodes, and are wired at one end. The two battery modules 31 are joined at two parts of the middle portion by connecting members 33 formed from insulating resin such as nylon, and treated uniformly as a battery module pair unit 31A.

Each battery module pair unit 31A is arranged so that the longitudinal direction (i.e., axial direction) thereof conforms to the left and right direction, and that the wired end portion is set toward the left side. The battery module pair unit 31A which is disposed at the left cover 25L (i.e., the front side FR', that is, the opening side of the exterior case 21) is arranged so that each battery module 31 of the pair is disposed along the inclination of the high-voltage electrical equipment box 20. The battery module pair unit 31A which is disposed at the rear (i.e., bottom wall of the exterior case 21) is arranged so that each battery module 31 of the pair is disposed along the thickness direction of the high-voltage electrical equipment box 20 (i.e., orthogonal direction to the hind surface H) (see, FIG. 2).

All battery modules 31 are connected in series by suitably wiring each right side end portion (i.e., the end portion of the unwired side) of the battery module pair units 31A by a bus bar plate (i.e., wire connection portions) 37, so that the high-voltage battery 22a is constituted. An output terminal and an input terminal 38 of the anode and the cathode of the high-voltage battery 22a are extended from the bus bar plate 37. Each output/input terminal 38 is wired to the inverter unit 23 and the others at an output/input terminal rest 39 provided with the left cover 25L.

Each holder 34 is made from insulating resin such as nylon and is divided into an upper holder 34a, a middle holder 34b, and a lower holder 34c from the opening side of the exterior case 21 in the thickness direction of the high-voltage electrical equipment box 20. Seven battery module pair units 31A which are disposed on the opening side of the exterior case 21 are sandwiched and held between the upper holders 34a and the middle holders 34b. Seven battery module pair units 31A which are disposed on the bottom wall side of the exterior case 21 are sandwiched and held between the middle holders 34b and the lower holders 34c.

Each lower holder 34c is formed integrally with a separator (i.e., air induction member) 61 also made from an insulating resin such as nylon. The separator 61 has a plate-shape body 62 provided so as to substantially be stacked on a bottom wall 41b of an insulator body 41 and partitions the interior space of the insulator 36 into a battery arrangement space BT and an air intake path IN for cooling the battery.

Each holder 34 is arranged so as to be located at the same position in the left and right direction as the connecting member 33 of each battery module pair unit 31A and is fitted on each external form of the connecting member 33. Each battery module pair unit 31A is positioned in the direction of left and right and such by engaging a circular protrusion (i.e., jointed portion) 53 which is formed at the inner periphery of the battery module 31 with a circular groove (i.e., joining portion) 54 which is formed at the outer periphery of the holder 34 (see, FIGS. 6 and 14).

The insulator 36 is constituted as a lining of the exterior case 21 and covers all of the high-voltage battery 22a except an air inlet 44, an air outlet 45 for cooling the battery, the output/input terminal rest 39, or the like. The insulator 36 has an insulator body (divided body) 41, an insulator upper portion (divided body) 42 which is separately constituted as a portion corresponding to the opening of the exterior case 21, and an insulator side portion (divided body) 43 which is separately constituted as a side wall portion of the inverter unit 23 vicinity (i.e., the right side). The side wall of the inverter 23 vicinity is also a portion which faces toward the bus bar plate 37, which is a wiring portion of the high-voltage battery 22a.

The insulator upper portion 42 is mounted on the left cover 25L and handled uniformly. The insulator body 41, the insulator upper portion 42, and the insulator side portion 43 are connected by fitting their protruding and depressed portions with each other, so that the rigidity of the insulator is improved and air for cooling the battery introduced into the insulator 36 is prevented from leaking.

Each holding frame 35 extends inside the insulator body 41 over an upper wall 41a, the bottom wall 41b, and a lower wall 41c of the insulator body 41 forming substantially a U-shape in the side-view, and has a sectional shape protruding at the middle portion of the width direction (i.e., the left and right direction) thereof toward the inside of the insulator 36. Facing portions 51 bending toward the outside of the insulator 36 are formed on both end portions of each holding frame 35.

The portions in each holding frame 35 along the upper wall 41a, the bottom wall 41b, and the lower wall 41c of the insulator body 41 will be explained as an upper bar, a bottom bar, and a lower bar respectively in the following. In each holding frame 35, a portion which protrudes from the middle in the width direction with their side portions is explained as a protrusion, and portions which constitute the side portions and the lower bar is explained as legs.

A pair of base frames 52 corresponding to each holding frame 35 is fitted to the left cover 25L along the inclination of the high-voltage electrical equipment box 20. Both facing portions 51 of the holding frame 35 are fixed to both ends of the corresponding base frame 52. Each of the holding frame 35 and the base frame 52 are disposed at the same position as each holder 34 in the left and right direction. The battery module pair units 31A are held in a state of engaging the holding frames 35 and the base frames 52 with the outer form of the holders 34.

When the above battery box 22 is assembled, at first, the holding frames 35 are installed on the inside of the insulator body 41, and then the separator 61 is mounted on the bottom bars of the holding frames 35 via spring members (elastic members) 71 explained later in detail. Next, seven battery module pair units 31A near the bottom wall of the exterior case 21 are disposed on each of the lower holders 34c formed integrally with the separator 61, and then the middle holders 34b are fitted to those battery modules 31. Next, three battery module pair units 31A near the opening of the exterior case 21 are disposed on the middle holders 34b, and then the upper holders 34a are installed on those battery modules 31.

Further, the base frames 52, the upper insulator 36, and the left cover 25L, which are integrally assembled in advance, are mounted on the upper holders 34a, and the base frames 52 and the holding frames 35 are fixed. Then, the bus bar plate 37 is fixed to the battery module pair units 31A from the right side thereof and wired thereto. Finally, the insulator side portion 43 is fixed to the bus bar plate 37 from the right side thereof, and the assembly of the battery box 22 is finished.

The assembled battery box 22 is stored in the exterior case 21 on the left side which is previously disposed on a prescribed position of the vehicle. The respective upper ends and lower ends of the base frames 52 are wired to the rear parcel 13 and the rear cross member 12 with the respective upper end and lower end of the exterior case 21.

Accordingly, the battery box 22 is supported by the vehicle skeleton members in a state of being stored inside the exterior case 21, and the left side of the opening of the exterior case 21 is covered by the left cover 25L.

Figure 5:
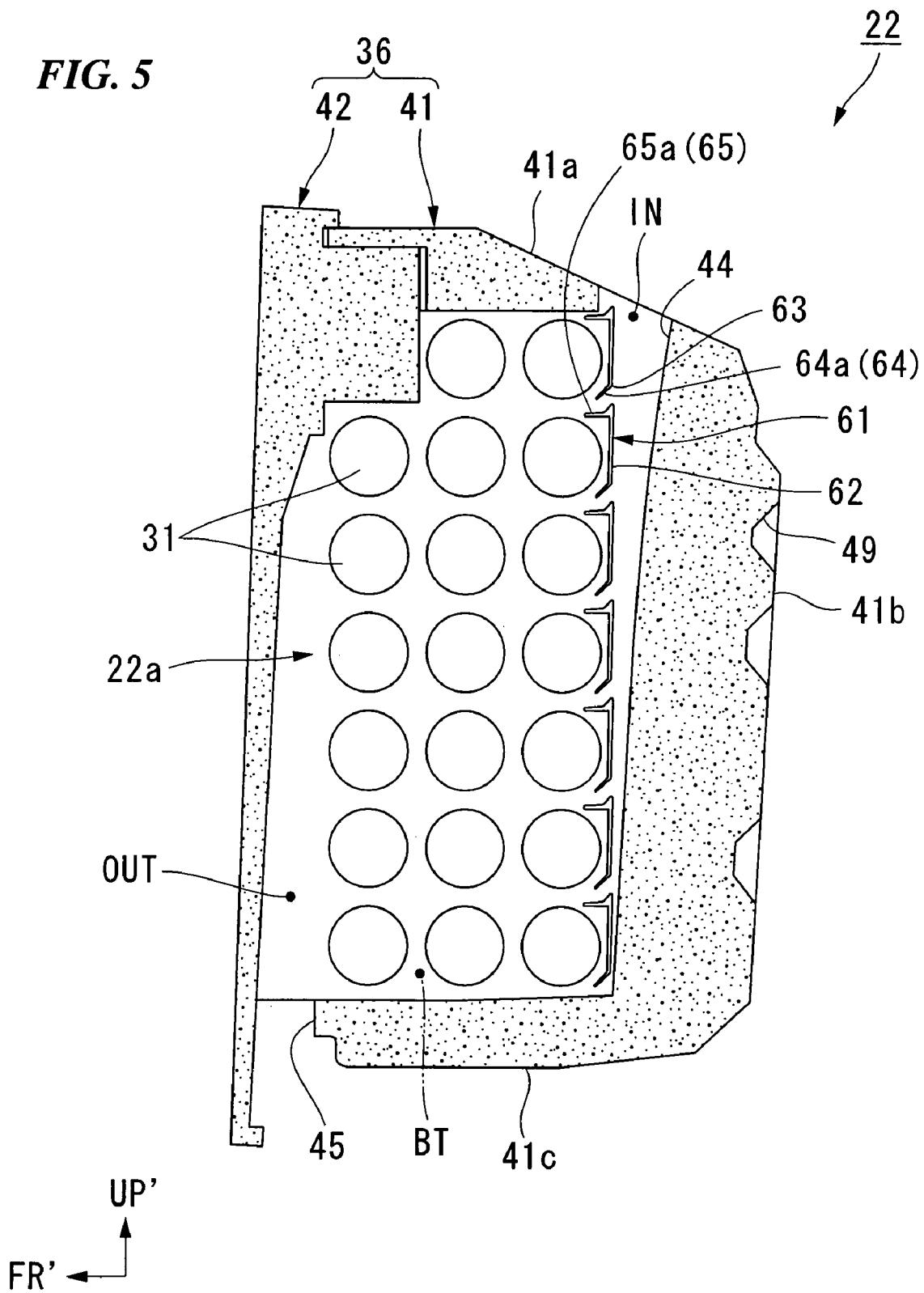
FIG. 5 is a schematic sectional view taken along a surface orthogonal to the horizontal direction of the high-voltage electrical equipment box.

The air inlet 44 is provided at the upper wall 41a of the insulator body 41 in order to introduce air into the insulator 36 for cooling the battery. As shown in FIG. 5, the air inlet 44 is communicated with the air intake path IN by the bottom wall 41b of the insulator body 41. Air introduced into the air intake path IN flows toward the lower wall 41c of the insulator body along the bottom wall 41b and the separator 61 of the insulator body 41, into the battery arrangement space BT successively via a plurality of openings 61 formed on the separator 61, and cools the battery modules 31. The upper side and the lower side of the air flow direction in the air intake path IN may be designated as simply the upper side and the lower side.

The air is exhausted outside the insulator 36 from the air outlet 45 formed between the lower wall 41c of the insulator body 41 and the insulator upper portion 42 after cooling the battery modules 31. The cooling air exhausted from the insulator 36 passes through the gap between the lower wall 41c of the insulator body 41 and the lower wall of the exterior case 21, reaches to the right side of the high-voltage electrical equipment box 20, and is used for cooling the inverter unit 23. The insulator body 41 is improved in the shock absorbency of the impact from the trunk room 8 by forming the bottom wall 41b so as to be thick.

The current speed in the lower side of the path is maintained by the air intake path IN formed between the bottom wall 41b and the separator 61 is made narrower at from the air inlet 44 side to the lower wall 41c of the insulator body 41 than the other portion. The cooling air can flow into the battery arrangement space BT side by making the surface of the bottom wall 41b of the insulator body 41 fronting the separator 61 bend gently protruding toward the separator 61.

The air introduced from the openings of the separator 61 into the battery arrangement space BT flows toward the insulator upper portion 42 from the bottom wall 41b of the insulator body 41b while passing between the battery modules 31 and cooling them, reaches the air outlet path OUT formed between the battery modules 31 and the insulator upper portion 42, and then is exhausted outside the insulator 36 from the air outlet 45.

The opening area of the air outlet 45 is less than the total area of the gaps between the battery modules 31, i.e., the total area of the air paths passing between the battery modules 31. Accordingly, the current speed of the air in the air outlet 45 is increased. The battery modules 31 are easily cooled evenly along the longitudinal direction thereof since the opening area of the air outlet 45 varies along the left and right direction, i.e., the longitudinal direction of the battery modules 31.

The openings 63 of the separator 61 are formed so as to be long sideways along the longitudinal direction (i.e., the left and right direction) of the battery modules 31 and so as to be positioned immediately behind the gaps between the battery assemblies. Each of the openings 63 at the body 62 of the separator has an upper protrusion 64 and a lower protrusion 65 which respectively protrude from the upper end edge and the lower end edge of each opening 63 toward the battery modules 31 and which guide the air for cooling the battery.

Respective air guide surfaces 64a and 65b of the protrusion 64 and 65 are inclined so that the distal ends thereof are positioned above the proximal ends thereof so that the air flown into the openings 63 may be blown toward the battery modules 31, and formed as circular arcs having substantially the same center as the outside form of the battery module 31 which is positioned immediately above of the corresponding opening 63. The air flown into the openings 63 is blown toward the gaps between the battery modules 31 and cools them satisfactory.

Figure 6:
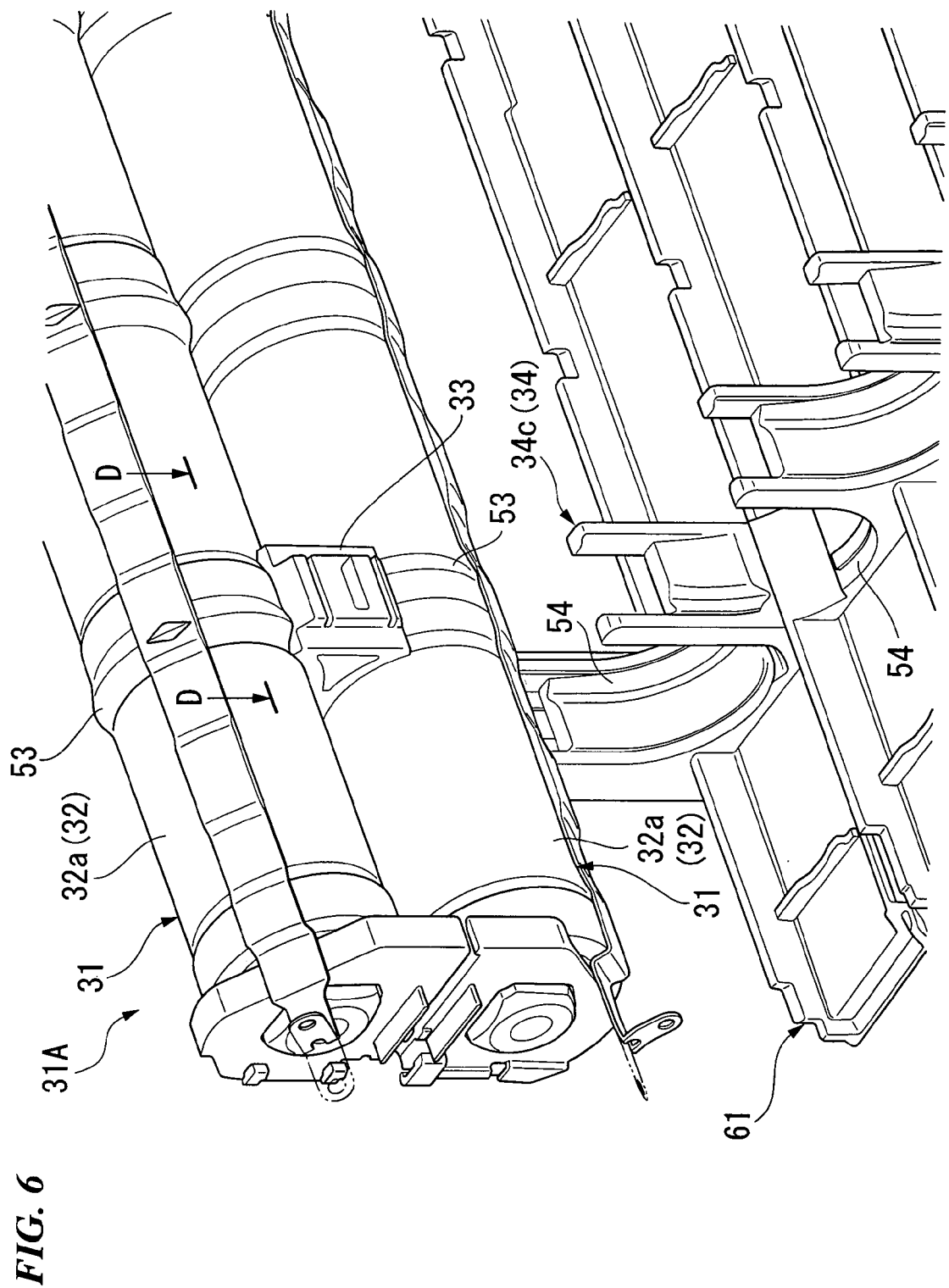
FIG. 6 is a perspective view showing a principal portion of a battery module and a separator of the high-voltage electrical equipment box.
Figure 14:
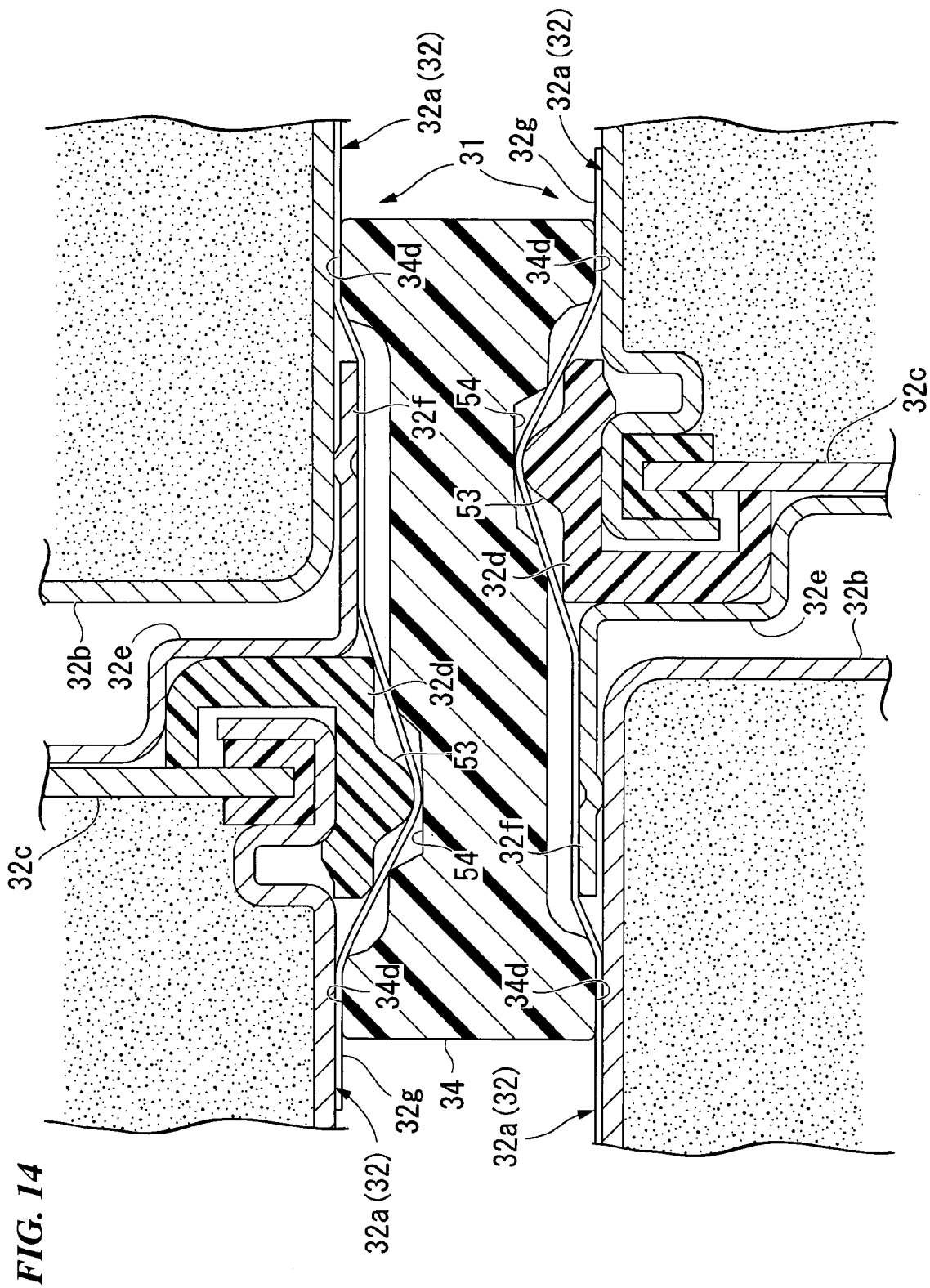
FIG. 14 is a sectional view taken along the line D-D in FIG. 6.

As shown in FIGS. 6 and 14, the single cells 32 constituting the battery modules 31 has metal outer tubes 32a on the outer periphery thereof. The anode side end of the outer tube 32a is blocked by a bottom wall 32b which is uniformly formed; the cathode side end is blocked by a plate 32c which is separated.

In such connecting portions between the single cells 32, a resin-made connecting ring 32d is fitted and installed on the outer peripheral of the cathode side end; and a metal-made connecting ring 32e is fixed to the plate 32c by welding or the like.

A cylindrical skirt 32f into which the other single cell 32 is fitted is formed on the connecting ring 32e. In the single cells 32, the skirt 32f and the outer tube 32a of the other single cell 32 are joined structurally by a welding. The single cells 32 are covered after jointing by an insulating film 32g forming the outer surface of the battery module 31.

The circular protrusion 53 is formed on the outer periphery of the connecting ring 32d of the single cells 32. The circular protrusion 53 is provided at one end (e.g., the end of the cathode side) of the single cell 32 for the sake of connecting the single cells 32 having the same construction in series. Viewing in one battery module 31, the circular protrusion 53 is provided at the connecting portion of the single cells 32 near one side (e.g., the anode side) from the center of the battery module 31 along the longitudinal direction.

The battery modules 31 are held by the holders 34 at the vicinity of the connecting portion of the single cells 32 located at both ends of the battery module 31 and the single cell 32 located inside them. The circular grooves 54 fitting to the circular protrusions 53 are formed on portions of the holder 34 to which the outer periphery of the battery module 31 is fitted. The circular groove 54 is provided at a portion near one side (e.g., the anode side) from the center of the battery module 31 along the longitudinal direction, similarly to the circular protrusion 53. Accordingly, the anode and cathode of the battery modules 31 are prevented from being inverted by mistake by mounting the battery modules 31 on the holders 34 so as to fit with the circular grooves and the circular protrusions 53.

Both sides of the holder 34 in the longitudinal direction of the battery modules 31 are holding portions 34d which actually hold the battery modules 31 by contacting the outer tube 32a avoiding the connecting portions between the single cells 32. The holder 34 does not hold the battery modules 31 between the holding portion 34d but positioning the battery modules 31 by fitting to the circular protrusion 53 and the connecting member 33.

The battery modules 31 are positioned in the longitudinal direction (i.e., the axial direction) of the battery modules 31 and the orthogonal direction thereto by fitting the circular groove 54 to the circular protrusion 53 and by fitting the holders 34 to the connecting members 33 at the battery module pair units 31A. The holding portions 34d of the holders 34 are in contact with the outer tube 32a of the single cells 32 in the battery module 31 in this state, and the battery modules 31 are held by the holders 34. Accordingly, the load of the battery modules 31 are input to the outer tube 32a avoiding the connecting portions between the single cells 32.

The adjacent battery modules 31 are arranged so as to alternate the anode with the cathode in order to be connected in series. Accordingly, the circular protrusions 53 of the adjacent battery modules 31 are shifted near each other. Therefore, the circular protrusions 53 do not increase the space between the battery modules 31 and do not enlarge the high-voltage battery 22a.

Figure 8:
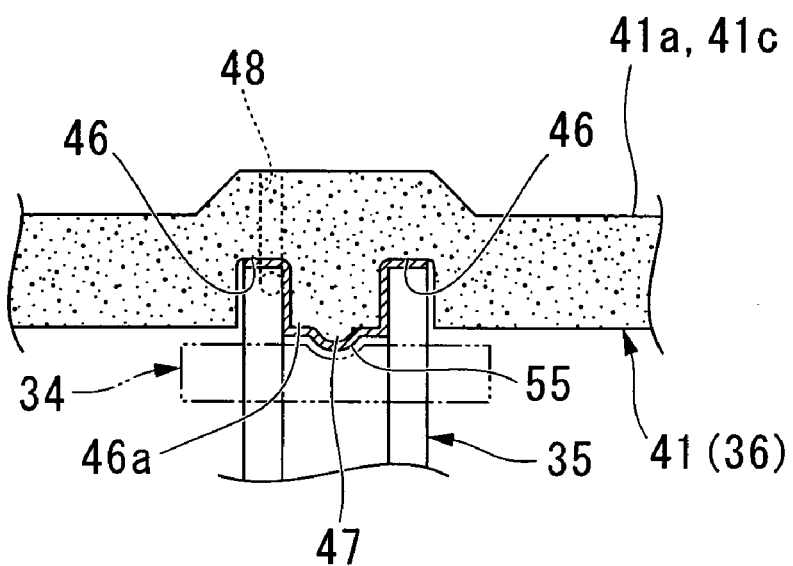
FIG. 8 is a sectional view taken along the line A-A in FIG. 7.
Figure 9:
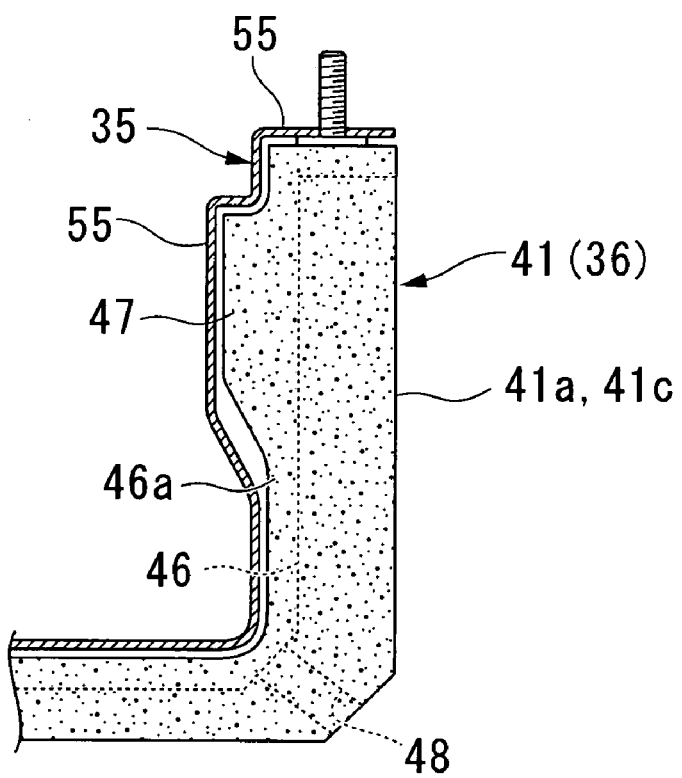
FIG. 9 is a sectional view taken along the line B-B in FIG. 7.

As shown in FIGS. 7, 8, and 9, a pair of grooves 46 in which the legs of the holding frames 35 are fitted are formed on a portion of the insulator body 41 to which the holding frames 35 is installed. A center portion 46a between the grooves 46 is inserted inside the protrusion of the holding frame 35.

Beads (restrainers) 47 protruding from each center portions 46a of the upper wall 41a and the lower wall 41c toward the inside the insulator body 41 are formed on the insulator body 41. Frame-side beads (restrainers) 55 fitting respectively to the beads 47 are formed at the top of the protrusions of the upper and lower bars of the holding frames 35 so that the frame-side beads 55 extend along the longitudinal direction of the holding frames 35 having a half-circle section.

The beads 47 extend from the rear ends of the upper and lower walls 41a and 41c of the insulator body 41 to the middle of the way to the bottom wall 41b. The frame-side beads 55 extend to the middle of the way to the bottom bar of the holding frame 35. When the holding frames 35 are installed onto the insulator body 41, the upper and lower walls 41a and 41c are bent by the height of the beads 47, the folding frames 35 are placed inside the upper and lower walls 41a and 41c of the insulator body 41, the legs of the holding frames 35 are inserted in the groove 46, and the frame-side beads 55 and the beads 47 are engaged.

At this time, since the insulator body 41 is made from expanded resin, a structure of which attaching/detaching the holding frames 35 while elastically deforming the insulator body 41 (i.e., a structure of which detaching the holding frames 35 from the insulator body 41 by force) can be adopted.

Thus engaging the insulator body 41 with the holding frames 35, thereby the holding frames 35 are prevented from moving to be left from the insulator body 41, accordingly the holding frames 35 can be handled uniformly with the insulator body 41. The end portion of each bead 47 of the insulator body 41 near the bottom wall 41b is gently inclined so as to improve the removableness of the holding frames 35.

The distal ends of the protrusions of the holding frames 35 are set to be flush with the inner surface of the insulator body 41. The frame-side beads 55 further protruding from the protrusions of the holding frames 35 are engaged with the grooves formed outside of the holders 34, thereby not only the holders 34, but also the battery modules 31 can be positioned in the longitudinal direction (i.e., the left and right direction) (see, FIG. 8).

Draining holes 48 pierce corners of the insulator body 41 near the bottom wall 41b from the bottom surface of the grooves 46 to the outside of the insulator body 41. The draining holes 48 function so as to drain liquid in the insulator 36 outside. The draining holes 48 are located at the lowest end in a state in which the battery box 22 is mounted on the vehicle, and are covered by the legs of the holding frames 35 when the holding frames 35 are mounted on the insulator body 41. Accordingly, the leakage of air flowing in the insulator 36 for cooling the battery is restrained even though plugs or the like covering the draining holes 48 are not provided.

Figure 10:
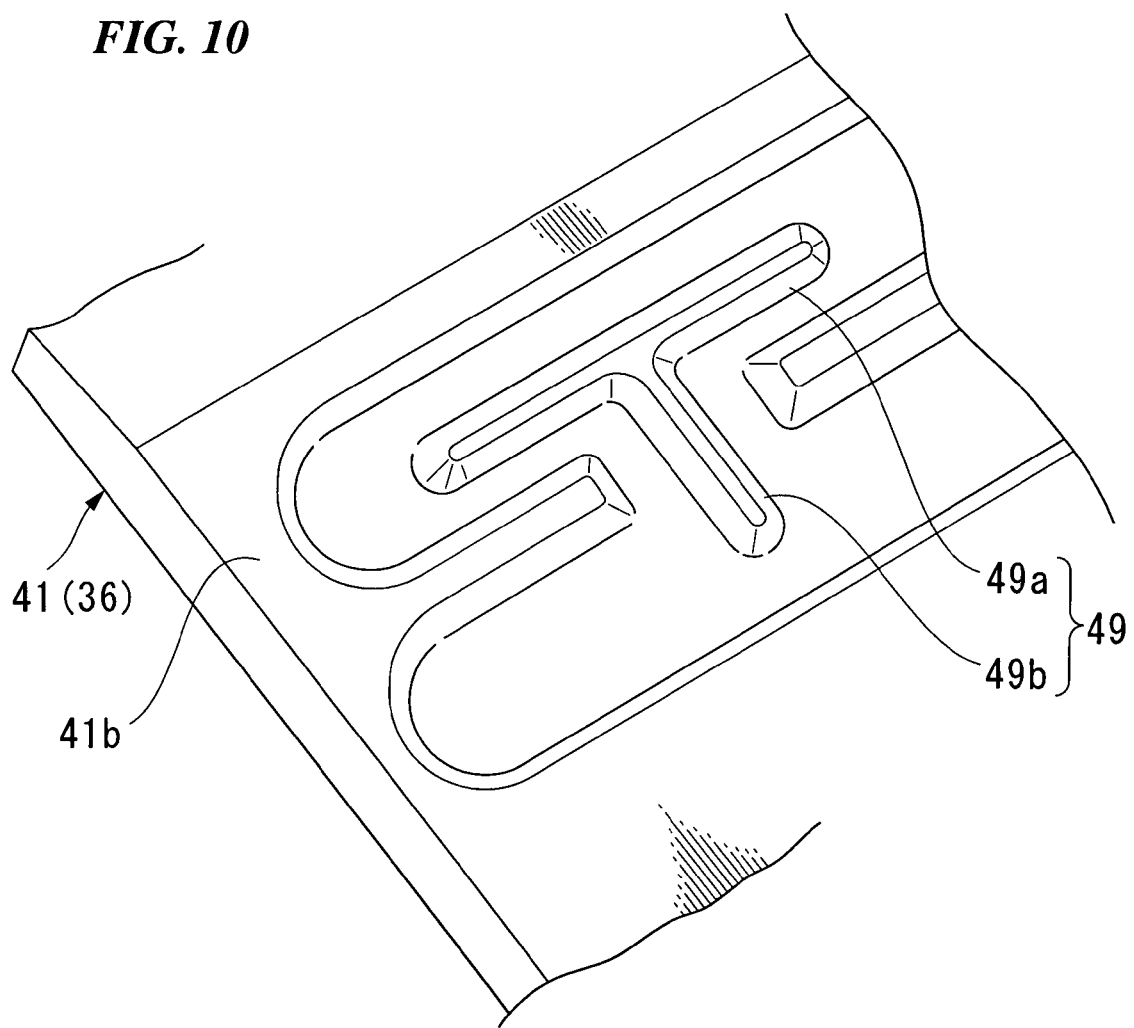
FIG. 10 is a perspective view showing a principal portion of the rear side of the insulator.

As shown in FIG. 10, on the outside of the bottom wall 41b of the insulator body 41, a hollow bead (positioning portion) 49 having an upper bar 49a extending along the left and right direction and a protruding bar 49b extending from substantially the center of the upper bar 49a downward by the inclination of the high-voltage electrical equipment box 20 is formed (see, FIG. 5). The hollow bead 49 is formed so that each of the bars thereof has a V-shaped section. A protruding bead (positioning portion) 21a having a mountain-shaped section (V-shape) fitting the hollow bead 49 is formed on the bottom wall of the exterior case 21 (see, FIG. 3).

The relative position between the insulator body 41 and the exterior case 21 along the left and right direction and the incline direction of the high-voltage electrical equipment box 20 is settled by storing the insulator body 41 in the exterior case 21 so as to fit the protruding bead 21a and the hollow bead 49. The insulator body 41 and the exterior case 21 are easily relatively positioned by being guided along each inclined surface of the sections since the hollow bead 49 has the V-shaped section and the protruding bead 21a is formed to have the mountain-shaped section (V-shape). The high-voltage electrical equipment box 20 is relatively positioned in the thickness direction by contacting the bottom wall 41b of the insulator body 41 with the bottom wall of the exterior case 21.

Figure 11:
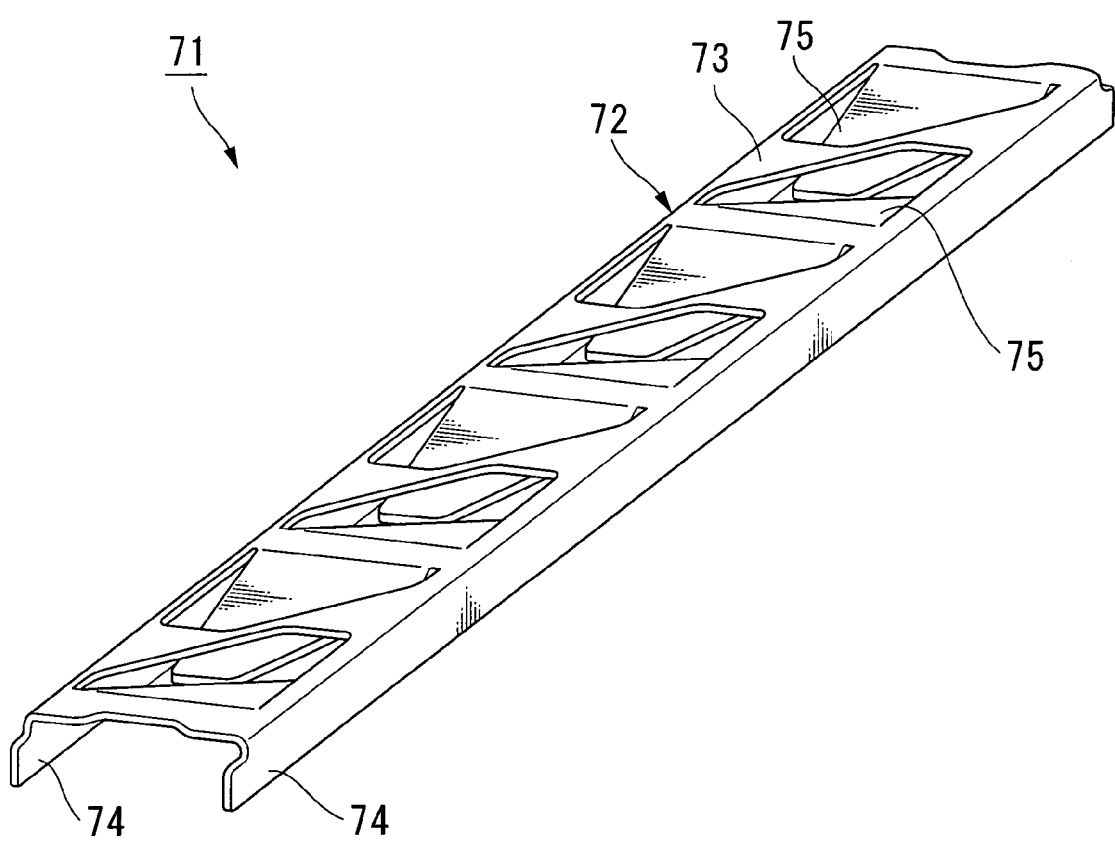
FIG. 11 is a perspective view showing a spring member of the high-voltage electrical equipment box.

As shown in FIG. 11, each spring member 71 disposed on the bottom bar of the holding frames 35 is a long member extending over both ends of the bottom bar which is a spring steel plate formed by punching or the like. A body 72 of the spring member 71 has an upper wall 73 along the distal end of the protrusion of the holding frame 35 and short flanges 74 rising downward from both side edges of the upper wall 73. The range between the short flanges 74 is set to be the same as the width of the protrusion of the holding frame 35, and both edges of the upper wall 73 are in contact with the both corners of the holding frames 35, so that the spring member 71 is positioned to the holding frame 35.

Figure 12:
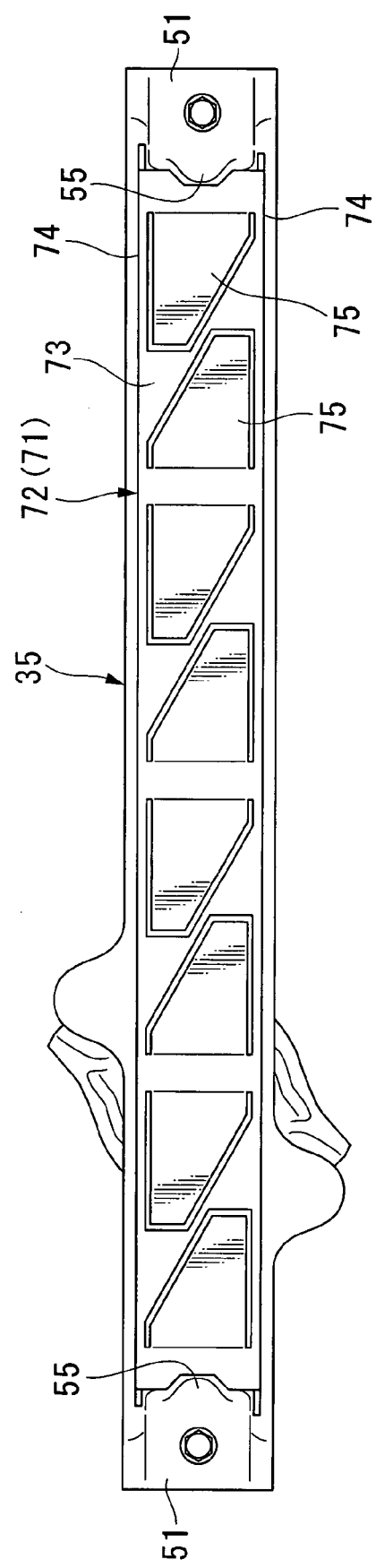
FIG. 12 is a plan view showing the spring member.

With referring to FIG. 12, the upper wall 73 of each of the spring members 71 is partitioned in the longitudinal direction thereof into four rectangle partitions aligning along the longitudinal direction. A pair of elastic pieces 75 are cut and rise diagonally toward the holding frames 35 from every one partition. The partition is cut out so that a diagonal line thereof is left, and each elastic piece 75 rises in a triangle tongue-like shape protruding from one short side, which is a proximal end, toward the other short side of the partition.

That is to say, each elastic piece 75 is movable with respect to the body 72 at the distal end thereof and forms a triangle tongue-like shape of which the width is narrower in the distal end than in the proximal end. The elastic pieces 75 forming a pair extend so as to face each other.

In each spring member 71, the pair of elastic pieces 75 in the one partition overlap (i.e., adjoin) each other at their distal ends in a longitudinal direction of the upper wall 73 (i.e., the extending direction of the elastic pieces 75), thereby the space of the upper wall 73 is used effectively and the strokes of the elastic pieces 75 are increased.

The distal ends of the elastic pieces 75 are in contact with the bottom bar of the holding frame 35, thereby the upper walls 73 of the spring members 71 are distant from the holding frame 35. The battery box 22 is mounted on the upper wall 73 interposing the separator 61 and the holder 34 therebetween, thereby the battery modules 31 are elastically held. Each of the spring members 71 has the plurality of elastic pieces 75 and is positioned with respect to the holding frame 35 in the direction orthogonal to the elastic load, thereby the battery modules 31 are loaded stably at appropriate points.

The upper wall 73 of each of the spring members 71 is in area contact with the resin-made separator 61, thereby the deterioration of the holding load by a creep of the separator 61 can be restrained. Further, the spring members 71 are mounted so that the short flanges 74 fit the holding frame 35, thereby the spring members 71 are prevented from be misassembled by inverting the inside and the outside thereof.

As explained above, the structure of the battery box 22 in the present embodiment is a structure in which the plurality of battery modules 31 are held by the pair of holding frames 35 and stored in the insulator; the insulator is made from the expanded insulating resin.

According to this structure, effects in thermal insulation, impact resistance, insulation, and weight reduction can be obtained, noise by looseness from inside the insulator 36 can be prevented from leaking, and paths for cooling air of the battery can be easily formed in the insulator 36.

Thus, the reduction in size, weight, and cost of the battery box 22 can be realized by adding a plurality of function to the insulator 36.

The battery box structure is constituted so that a portion (i.e., the insulator side portion 43) which faces to the bus bar plate 37 which is the wiring portion of the battery modules 31 in the insulator 36 is dividable from the insulator body 41 and the insulator upper portion 42. Accordingly, since the wiring is possible in a state in which the battery modules 31 are stored in the insulator 36, the battery box 22 can be easily assembled and maintained, and the processes can be decreased.

In the above battery box structure, the insulator body 41, the insulator upper portion 42, and the insulator side portion 43 as a plurality of divided bodies constituting the insulator 36 are connected so as to fit their protruding and depressed portions. That is to say, the leakage of the cooling air of the battery from the insulator 36 can be easily and reliably prevented.

In the above battery box structure, the spring members 71 are provided between the battery modules 31 and the holding frames 35, the spring member 71 has the plurality of tongue-shaped elastic pieces 75 deformed with respect to the plate-shaped body 72, and the width of the elastic pieces 75 is narrower in the distal end than the proximal end thereof.

According to this construction, elastic force is applied to the battery modules 31 which are held on the holding frames 35 by the spring members 71. Accordingly, a small load applied by the battery modules 31 can be absorbed by bending the distal ends of the elastic pieces 75; large load is absorbed by bending the proximal ends of the elastic pieces 75.

That is to say, the noise by looseness of the battery modules 31 can be prevented by holding the battery modules 31 elastically and flexibly.

In the above battery box structure, since each two of the elastic pieces 75 of the spring members 71 oppositely extending form a pair, when the spring members 71 absorb loads, if forces to move the spring members 71 along a direction substantially orthogonal to the deformation stroke of the elastic pieces 75 are generated, such forces can be cancelled by the elastic pieces 75 oppositely extending.

That is to say, the battery modules 31 can be favorably held while preventing the shift of the spring members 71 when absorbing the loads.

In the above battery box structure, each two of the elastic pieces 75 oppositely extending make a pair and extend to positions at which they alternately are arranged, thereby the extension length of the elastic pieces 75 can be increased; accordingly the deformation stroke of the elastic pieces 75 can be increased.

That is to say, the battery modules 31 can be favorably held by increasing the deformation stroke of the elastic pieces 75.

In the above battery box structure, the separator 61 having the plurality of openings 63 as an air induction member between the battery modules 31 and the spring members 71, and air introduced from the openings 63 of the separator 61 into the insulator 36 is blown toward the battery modules 31.

According to this construction, air can be blown to all of the battery modules 31 evenly, so that the battery modules 31 can be cooled. Elastic force is also applied to the separator 61 by the spring members 71.

That is to say, the cooling power of the battery modules 31 can be improved evenly all over. In addition, the noise by looseness of the separator 61 can be prevented.

In the above battery box structure, the separator 61 has the plate-shape body 62 forming the openings 63 and the protrusions 64 and 65 protruding toward the battery modules 31 and guiding the air, the air introduced into the insulator 36 along the body 62 of the separator 61 is circulated, and the air guide surfaces 64a and 65a of the protrusions 64 and 65 are inclined so that the proximal end thereof is positioned higher in a direction of the air circulation than the distal end thereof.

According to this construction, the air ventilated along the separator 61 can be smoothly blown along the air guide surfaces 64a and 65a to the battery modules 31 when being introduced via the openings 63.

That is to say, the cooling power for the battery modules 31 can be further improved.

In the above battery box structure, since the circular protrusion 53 which is formed near the cathode or the anode of the battery module 31 and the circular groove 54 which is formed at the separator 61 which is engaged with the circular protrusion 53, misassembling of the battery box 22 inverting the anodes and cathodes of the battery module 31 is prevented and the battery modules 31 can be easily positioned in the axial direction, thereby the assembling of the battery box 22 can be made easy and the processes can be reduced.

In this battery box structure, each battery module 31 has the plurality of single cells 32 connected in series; the outer tube 32a of each of the single cells 32 is held by the holding portion 34d in the vicinity of the circular groove 54 when the circular protrusion 53 and the circular groove 54 are engaged with, thereby the loads of the battery modules 31 are applied to the outer tube 32a of the single cell 32, accordingly the loads to the connecting portion between the single cells 32 are reduced. That is to say, the battery modules 31 are favorably held while reducing the loads to the connecting portions between the single cells 32.

In the above battery box structure, the hollow bead 49 and the protruding bead 21a which decide the relative position in directions are respectively provided at the insulator 36 and the exterior case 21 covering the insulator 36, thereby the battery box 22 can be easily assembled with the exterior case 21. Accordingly, the cost can be reduced by reduction of the processes.

Furthermore, in the above battery box structure, the bead 47 and the frame-side bead 55 which prevent the holding frames 35 from moving to be left from the insulator 36 are provided at the insulator 36 and the holding frame 35 respectively, thereby the insulator 36 and the holding frame 35 can be handled integrally while assembling the battery box 22. Accordingly, the processes can be reduced the same as the above.

In the above battery box structure, since the draining holes 48 are arranged at positions at which the holding frames 35 are overlapped in the insulator 36, the cooling air can be prevented from leaking from the draining holes 48 while air is circulated in the insulator 36 for cooling the battery modules 31. Accordingly the cooling power of the battery modules 31 can be improved and the battery box 22 can be downsized.

Figure 13:
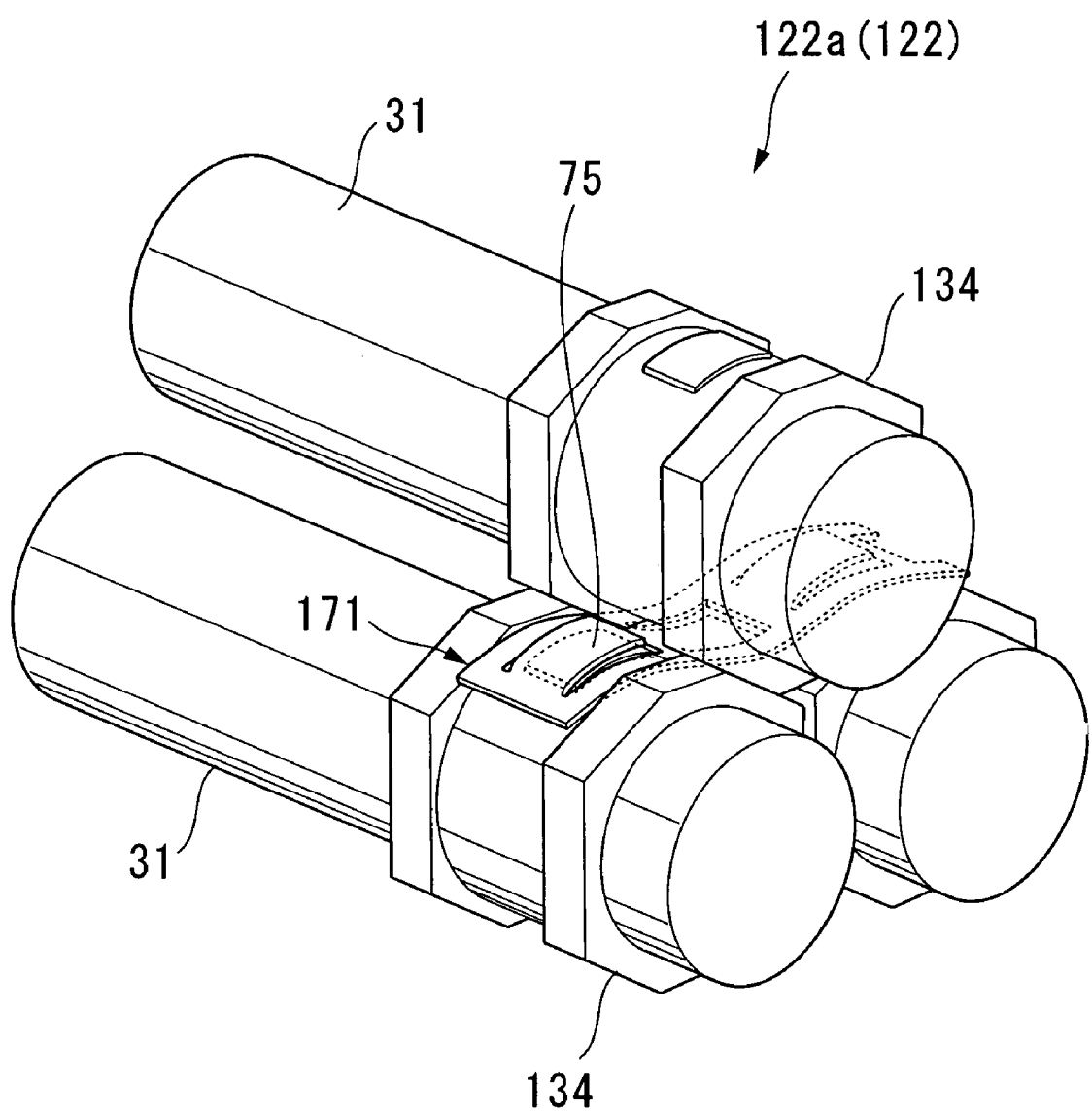
FIG. 13 is a perspective view showing a modification example of the embodiment.

The present invention should not be limited to the above embodiment, but a battery box 122 storing a high-voltage battery 122a having a structure shown in FIG. 13 would be permissible.

That is to say, the high-voltage battery 122a is formed by alternately stacking the plurality of battery modules 31. The high-voltage battery 122a alternates with the high-voltage battery 22a and is stored in the insulator 36 while being held by the holding frame 35. Insulating resin-made holder members 134 having hexagon-shape viewed in the longitudinal direction are installed to the outer periphery of both ends of the battery modules. The battery modules 31 are alternately stacked by stacking the holder members 134 in honeycomb structure. Gaps for circulating cooling air are formed between the battery modules 31.

In this battery box 122, a wavy plate-shaped spring member (i.e., elastic member) 171 is arranged between the holder members 134 (i.e., between the battery modules 31). The spring member 171 has a plate-shaped body with the plurality of elastic pieces 75. The battery modules 31 are elastically held in stacking state by the elastic force of the spring member 171.

According to this construction, since the elastic force of the spring member 171 is applied directly to the battery modules 31 held by the holding frame 35, the battery modules 31 are favorably held and dimension deviation generated due to stack the battery modules 31 can be elastically absorbed. That is to say, the battery modules 31 are elastically held so that noise by looseness thereof can be prevented.

The spring member 171 and further the battery box 122 can be downsized by reducing the stroke of the spring member 171. Cost can be reduced since the holder members for the battery modules 31 are uniformized.

A portion of the gap necessary for cooling air paths between the battery modules 31 can be effectively utilized as space for arranging the spring member 171. Accordingly, the battery box 22 can be downsized even though the spring member 171 is arranged between the battery modules 31.

The spring members 171 are formed so that the plurality of elastic pieces 75 are provided of the plate-shape body, thereby the arranging space for the spring members 71 can be reduced and elastic loads can be uniformly applied to each of the battery modules 31 by a small number of parts. Accordingly, the battery box 22 can be reduced in size and weight. This constitution is applicable when the battery modules 31 are stacked in grid.

The high-voltage battery 22a can be stored in the insulator 36 so that the bus bar plate 37 and the insulator upper portion 42 are faced. In this case, by integrating the insulator body 41 and the insulator side portion 43, airtightness can be improved and the wire-working property can be maintained.

Next, an embodiment according to the present invention of an inter-locking structure of an electrical equipment box and an electrical equipment box structure will be explained with reference to the drawings. The same reference symbols as in the first embodiment are used for common elements, and overlapping descriptions are omitted.

With reference to FIGS. 2 and 4, three battery module pair units 31A are arranged by the opening of the exterior case 21; and seven battery module pair units 31A are arranged by the bottom wall. The battery arrangement space BT is rectangular in a side view extending along the inclination of the high-voltage electrical equipment box 20. The battery modules 31 are arranged in the battery arrangement space BT; seven are along the incline direction (i.e., vertical direction) and three are along the thickness direction (i.e., horizontal direction).

The battery module pair units 31A by the opening of the exterior case 21 are arranged in order from the bottom. Accordingly, a non-battery arrangement portion NB is formed at an upper portion of the battery arrangement space BT which faces the hind surface H of the back seat 6.

Figure 15:
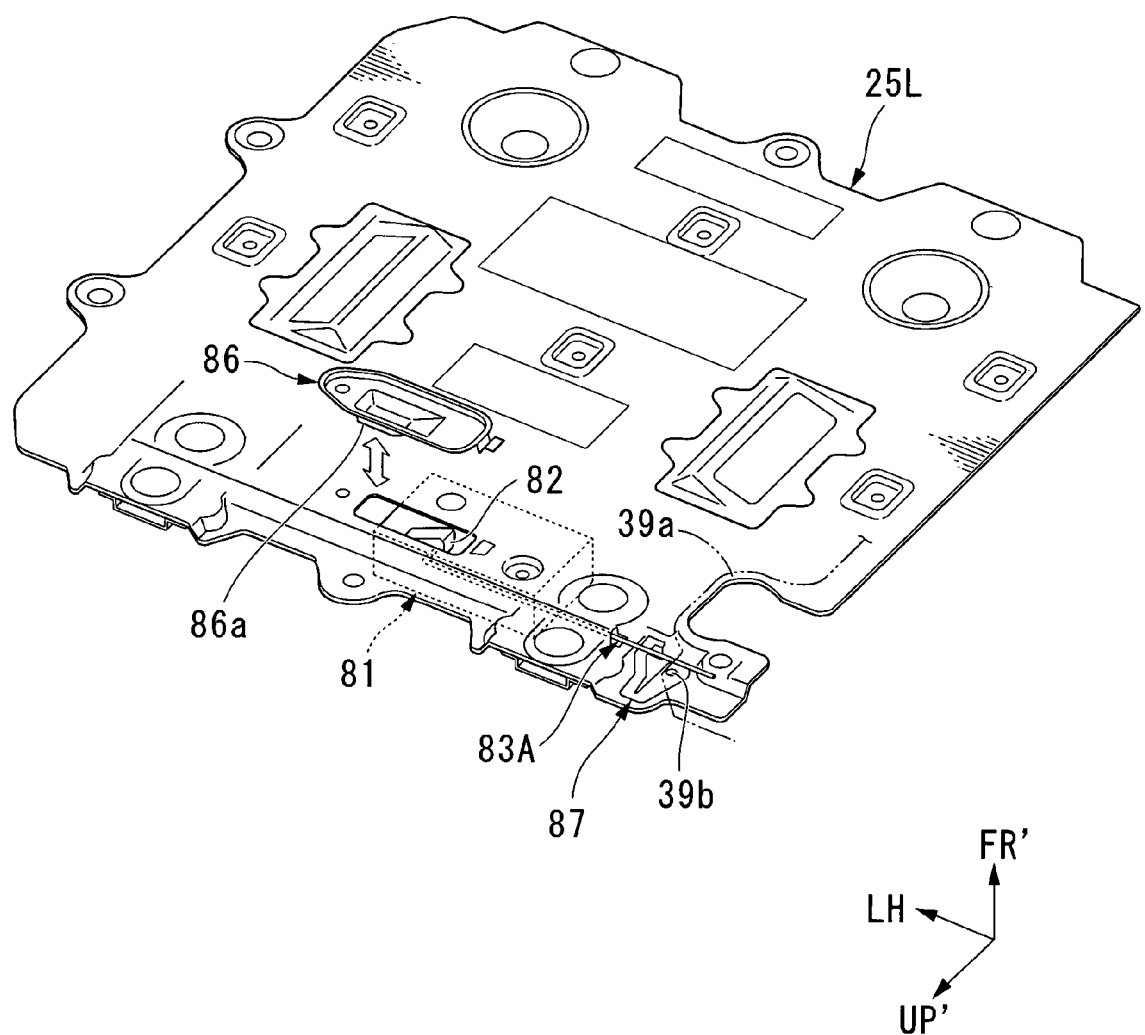
FIG. 15 is a perspective view showing an exterior member of the battery box.

As shown in FIG. 15, a main switch (i.e., power breaker) 81 which switches the electricity between the high-voltage battery 22a (i.e., each battery modules 31) and the output/input terminal 38 is provided on the center of the upper portion of the left cover 25L. The main switch 81 functions also as a so-called inter-locking structure which permits or restrains an access of tools to a fix bolt 39b of a terminal table cover covering the output/input terminal rest.

The main switch 81 has an operation lever 82 switching the electricity by swinging motion in the left and right direction. The operation lever 82 is directly connected with an interlock bar assembly (i.e., detachment restrainer) 83A which is held on the left cover 25L slidable along the left and right direction.

Figure 16:
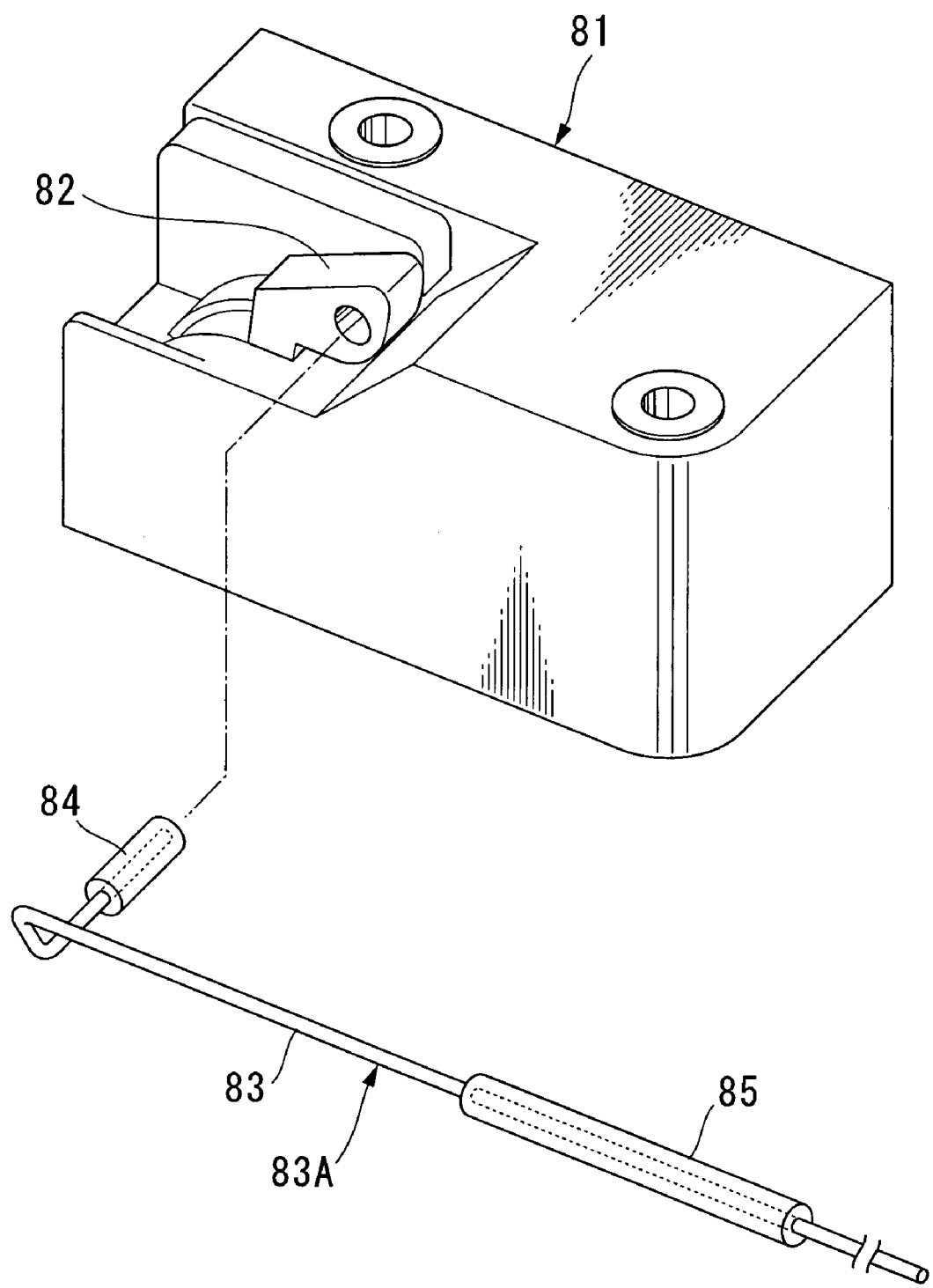
FIG. 16 is a perspective view showing a main switch and an interlock bar of the battery box.

With reference to FIG. 16, the interlock bar assembly 83A has an interlock bar (i.e., connector) 83 formed by bending a bar material and holders 84 and 85 mounted to the interlock bar 83. The interlock bar 83 permits or restrains the access of tools to the fix bolt 39b by sliding along with the fluctuation of the operation lever 82 and protruding or retracting the distal end thereof above the fix bolt 39b of the terminal table cover 39a.

The main switch 81 is disposed on the back side of the left cover 25L (i.e., the battery arrangement space BT side in the insulator 36). The main switch 81 enters into the non-battery arrangement portion NB on the upper part of the battery arrangement space BT.

The end portion of the interlock bar 83 by the operation lever 82 is loosely fitted into the engaging hole of the operation lever 82 via the resin-made fluctuant holder 84. The intermediate portion of the interlock bar 83 is slidably held to an insertion portion of the left cover 25L via the resin-made slide holder 85.

The main switch 81 is in an ON state (i.e., a state in which the electricity can pass between the high-voltage battery 22a and the output/input terminal 38) when the operation lever 82 fluctuates to the right side; and is in an OFF state (i.e., a state in which the electricity between the high-voltage battery 22a and the output/input terminal 38 is terminated) when the operation lever 82 fluctuates to the left side.

When the interlock bar 83 slides toward the right along with the fluctuation of the operation lever 82 to the right, the distal end of the interlock bar 83 advances above the fix bolt 39b of the terminal table cover 39a and tool access to the fix bolt 39b is restricted. When the interlock bar 83 slides toward the left along with the fluctuation of the operation lever 82 to the right, the distal end of the interlock bar 83 is refuged from above the fix bolt 39b of the terminal table cover 39a and tool access to the fix bolt 39b is permitted.

The operation lever 82 is disposed so as not to protrude from the outer surface of the left cover 25L. An opening is formed on the loft cover 25L in order to operate the operation lever 82. A switch cover 86 blocking this opening can be attached the opening. A protrusion 86a entering into the portion of which the operation lever 82 when the main switch is OFF is formed on the switch cover 86 (see, FIG. 17). By installing the switch cover 86 when the main switch is ON, extraneous materials cannot enter into the opening of the left cover 25L and failure of the main switch 81 turning ON can be reliably prevented.

As shown in FIGS. 17 to 20, a spring member 87 having an elastic piece 88 urged toward the interlock bar 83 is fixed to a portion of the left cover 25L which is a vicinity of the distal end of the interlock bar 83. The elastic piece 88 of the spring member 87 has a plate-shape substantially parallel to the interlock bar 83. A stopper wall (i.e., working restrainer) 89 is formed so as to rise from the edge of the elastic piece 88 opposed to the main switch 81

Figure 17:
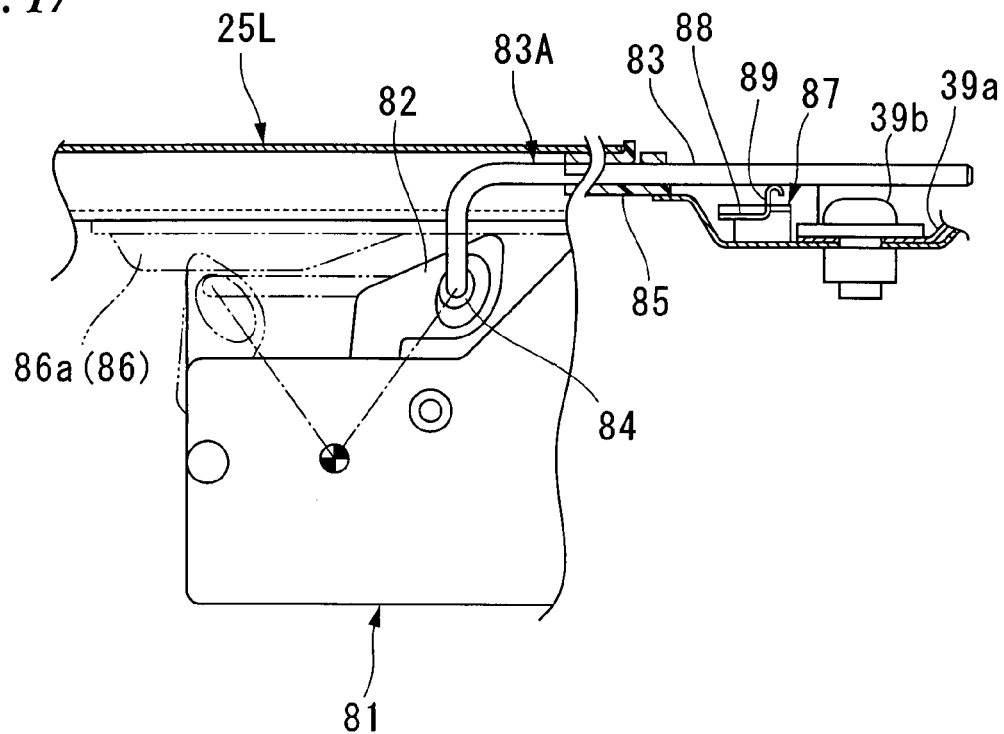
FIG. 17 is a first action view showing actions of the main switch, the interlock bar, and a stopper wall.
Figure 18:
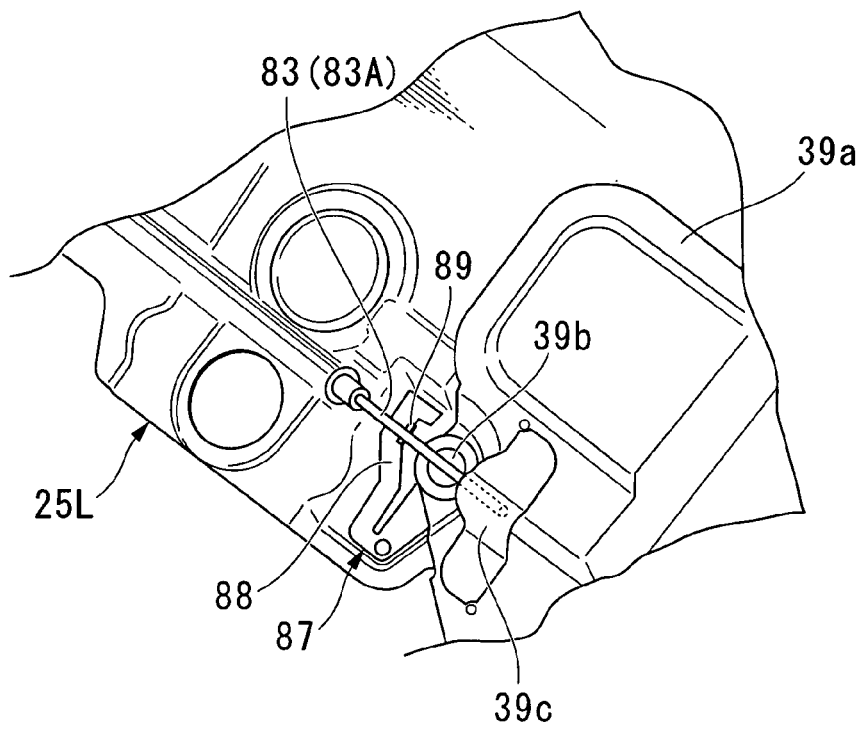
FIG. 18 is a perspective view of FIG. 17.

The spring member 87 isolates the vibration of the interlock bar 83 by elastic deforming of the elastic piece 88 by contacting the upper edge of the stopper wall 89 with the interlock bar 83 advancing above the fix bolt 39b in a state in which the main switch 81 is ON as shown in FIGS. 17 and 18. The distal end of the interlock bar 83 is inserted and held in a holding portion 39c provided on the terminal table cover 39a when the main switch is ON.

Figure 19:
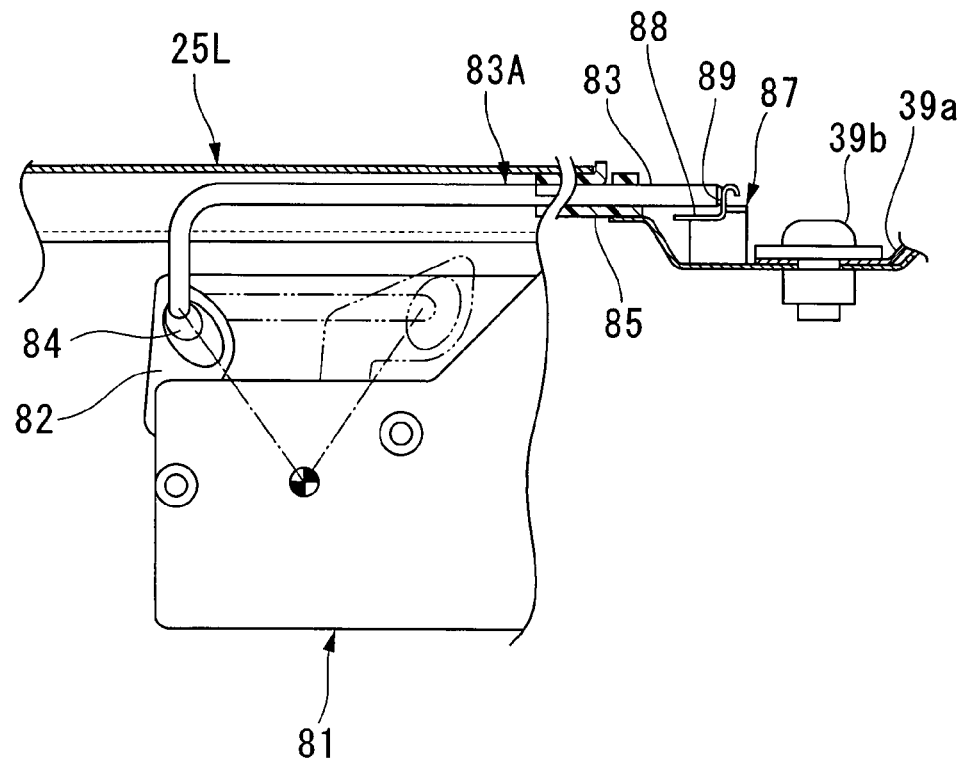
FIG. 19 is a second action view showing actions of the main switch, the interlock bar, and the stopper wall.
Figure 20:
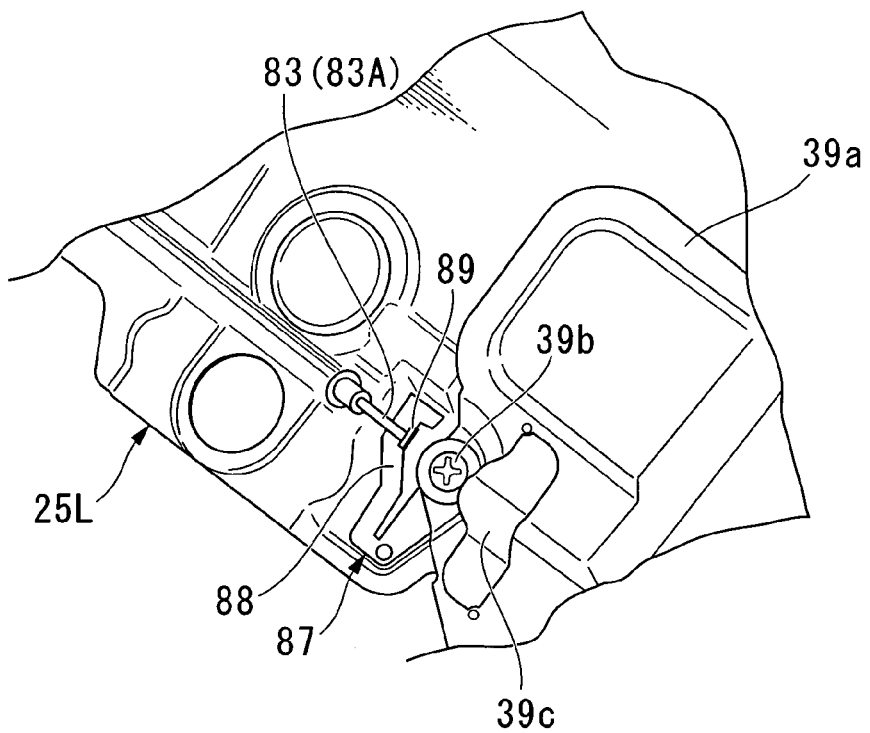
FIG. 20 is a perspective view of FIG. 19.
Figure 21:
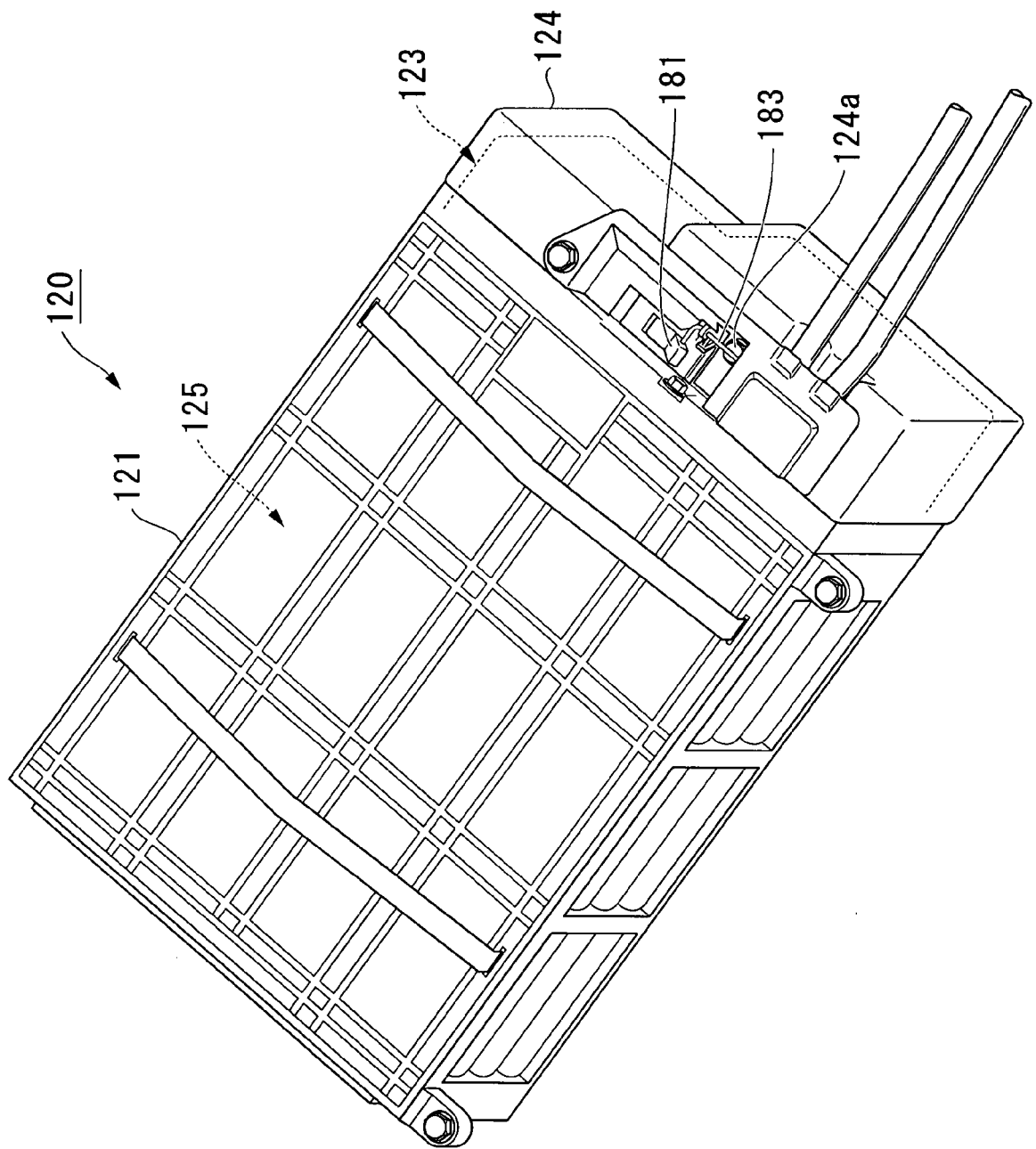
FIG. 21 is a perspective view showing a modification example of the battery box.

Comparatively, the interlock bar 83 is set so that the distal end thereof is refuged to immediately the left of the stopper wall 89 when the main switch 81 is OFF as shown in FIGS. 19 and 20. Thereby, the elastic deforming of the elastic piece 88 is revert in the height of the stopper wall 89, the elastic piece 88 is in contact with the interlock bar 83, and the stopper wall 89 is adjacent to the right of the distal end of the interlock bar 83.

When the main switch 81 is turned ON, if an attempt is made to singly move the operation lever 82, the interlock bar 83 connecting to the operation lever 82 is restrained from sliding left by the stopper wall 89. That is to say, the stopper wall 89 in the state in which the main switch is OFF is located at a working restrain position with respect to the interlock bar 83. Therefore, when the main switch 81 is turned ON from OFF, and the stopper wall 89 should be refuged from the working restrain position against the urging force.

As explained above, the inter-locking structure of the above embodiment is applied to the high-voltage electrical equipment box 20 which is provided with the high-voltage battery 22a and the insulator 36 in which the high-voltage battery 22a is stored, and has the main switch 81 of the high-voltage battery 22a, the interlock bar assembly 83A which restrains the detachment of the terminal table cover 39a covering the output/input terminal of the high-voltage battery 22a, and the stopper wall 89 which restrains the movement of the interlock bar assembly 83A in accordance with the state of the main switch 81.

According to this construction, when the main switch 81 breaks the power source of the high-voltage battery 22a and the detachment restraint of the terminal table cover 39a by the interlock bar assembly 83A is released, the movement of the main switch 81 connected with the interlock bar assembly 83A can be restrained by restraining the movement of the interlock bar assembly 83A by the stopper wall 89.

That is to say, the malfunction of the main switch 81 is prevented when the detachment restraint of the terminal table cover 39a is released.

In the above inter-locking structure, the interlock bar assembly 83A has the interlock bar 83 directly connected with the main switch 81, and the interlock bar 83 is moved by ON/OFF operation of the main switch 81 so that the detachment of the terminal table cover 39a from the high-voltage electrical equipment box 20 is restrained.

According to this construction, the parts number of the inter-locking structure can be reduced by directly connecting the main switch 81 and the interlock bar 83. Since the interlock bar 83 is made from a bar material, the location space thereof is reduced, and can be easily disposed relative to the fix bolt 39b.

That is to say, the parts number of the inter-locking structure can be reduced, so that the cost, weight and the failure probability can be reduced. In addition, the disposition latitude of the interlock bar 83 can be improved.

In addition, in the above inter-locking structure, the interlock bar 83 restrains the detachment of the fix bolt 39b fixing the terminal table cover 39a on the high-voltage electrical equipment box 20, specifically, restrains the tool access to the fix bolt 39b. Owing to such a simple structure, the detachment of the terminal table cover 39a from the high-voltage electrical equipment box 20 can be restrained; thereby the constitution of the inter-locking structure can be simplified, and thus their cost, weight, and failure probability can be reduced.

In addition, in the above inter-locking structure, the stopper wall 89 restraining the movement of the interlock bar 83 is urged toward the working restrain position to the interlock bar 83. In the working restrain position, when the main switch 81 is turned to ON from OFF, another action of refuging the stopper wall 89 from the working restrain position against the urging force is necessary.

According to this construction, when the main switch is OFF, that is to say, when the power source of the battery modules 31 are broken, and when the interlock bar 83 is released from the restraint of detaching the terminal table cover 39a, an urging force is applied to the stopper wall 89. Thereby, the movement of the interlock bar 83 is automatically restrained and the movement of the main switch 81 is automatically restrained. Accordingly, when the main switch 81 is turned ON from this state, i.e., when switching into a state in which the power source is connected with the battery modules, it is necessary to refuge the stopper wall 89 from the working restrain position against the urging force, and thereby the single malfunction of the main switch 81 is prevented.

That is to say, the malfunction of the main switch 81 can be reliably prevented when releasing the restraint by the terminal table cover 39a of detaching the terminal table cover 39a.

In the structure of the above high-voltage electrical equipment box 20, since the non-battery arrangement portion NB is provided in the battery arrangement space BT in the insulator 36, and the main switch 81 of the battery modules 31 (the high-voltage batteries 22a) is disposed in the non-battery arrangement portion NB, the non-battery arrangement portion NB in the insulator 36 can be effectively utilized as an arranging space for the main switch 81. Accordingly, utilizing the empty space in the battery arrangement space BT and the main switch 81 can be arranged efficiently.

In the above electrical equipment box structure, the battery modules 31 are arranged in a direction orthogonal to the axis with forming pairs and constitute a plurality of battery module pair units 31A, the battery module pair units 31A are arranged in the battery arrangement space BT which is a rectangle in the axial view, and the battery modules 31 are arranged so that odd numbers of them are arranged along the vertical and horizontal direction respectively in the axial view. Thereby, the non-battery arrangement portion NB, which is inevitable in the battery arrangement space BT in the insulator 36, can be effectively utilized as an arranging space for the main switch 81.

In the above electrical equipment box structure, the high-voltage electrical equipment box 20 is mounted behind the back seat of the vehicle 1, and the main switch 81 is disposed on the upper portion of the high-voltage electrical equipment box 20 so as to face the hind surface H of the back seat 6. Thereby, when the trunk room 8 is damaged by rear impact or the like, the main switch 81 can be easily accessed from the back seat 6 side. In addition, since the main switch 81 is disposed on the upper portion of the high-voltage electrical equipment box 20, it can be easily accessed by the operator from a relatively easy position; accordingly the operability of the main switch 81 can be improved.

The electrical equipment box of the present invention should not be limited to the above embodiments, but a structure such as a high-voltage electrical equipment box 120 shown in FIG. 13 would be permissible.

That is to say, electrical equipment such as an inverter or the like is installed integrally on a side portion of a battery box 125 covered with an exterior case 121. A main switch 181 is provided on the upper portion of the electrical equipment 123. The electrical equipment 123 is covered with a protection cover 124 so that only the main switch 181 is exposed. An interlock bar 183 is directly connected with the main switch 181 in order to restrain the tool access to a fix bolt 124a of the protection cover 124 in accordance with the state of the main switch 181.

Also in this constitution, the parts number of the inter-locking structure can be reduced, and a similar result to the above embodiments can be obtained such as reductions in cost, weight, and failure probability.

The above inter-locking structures can be applied not only to a hybrid vehicle, but also applied to an electric vehicle which travels by the driving force of an electric motor, and a vehicle such as a fuel cell-powered vehicle having a fuel cell as an electric power source to an electric motor. That is to say, the energy storage unit which is stored in the electrical equipment box is not limited to a battery; it may be at least one of a battery, a capacitor, and a fuel cell.

The above electrical equipment stored in the electrical equipment box may be equipment in which the above energy storage unit is used or equipment for utilizing the energy storage unit such as an inverter, a downverter, an electrical cable, a junction box (i.e., a switch board on which a fuse, a contactor, a current sensor or the like are mounted) or the like.

The above inner-locking structures do not have to restrain the detachment of the fixing member (including the tool access) which fixes a prescribed member to the electrical equipment box, rather may have a construction which directly restrains the prescribed member from moving toward a separation direction from the electrical equipment box.

A member in which their detachment is restrained from the electrical equipment box by the inter-locking structure may be the above energy storage unit or a portion thereof, or the above electrical equipment or a portion thereof.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

According to the present invention, by adding a plurality of functions to the case, the battery box can be reduced in size, weight, and cost.

According to the present invention, the malfunction of the power breaker can be prevented when the prescribed lock by the detachment restrainer is released.

The invention claimed is:

1. A battery box structure comprising:
   a battery module;
   a holding frame having a substantially U-shape which holds the battery module;
   a case which is made from expanded insulating resin and which stores the holding frame; and
   an elastic member formed separately from the holding frame and which is secured to the holding frame and arranged between the battery module and the case;
   wherein the elastic member includes an upper wall and flanges extending from both side edges of the upper wall;
   wherein a distance between the flanges is substantially the same as a width of a protrusion of the holding frame for securing the elastic member to the holding frame; and
   wherein a plurality of elastic pieces extends from the upper wall toward the holding frame.

2. The battery box structure according to claim 1, wherein a portion of the case which faces a wire connection portion of the battery module is dividable.

3. The battery box structure according to claim 1, wherein the case is constituted from a plurality of divided bodies which are connected with each other by fitting protruding and depressed portions thereof.

4. The battery box structure according to claim 1, wherein an air induction member which has a plurality of openings and blows air introduced into the case from the openings toward the battery module is provided between the case and the battery module.

5. The battery box structure according to claim 1, wherein the elastic member has a plate-shape body and the plurality of elastic pieces are provided on the body.

6. The battery box structure according to claim 5, further comprising:
   a second elastic member which is arranged between the battery module and the holding frame, wherein
   the second elastic member has a body and an elastic piece which is deformed in regard to the body, and wherein
   a distal end width of the second elastic piece is narrower than a proximal end width.

7. The battery box structure according to claim 6, wherein:
   the second elastic member has a plurality of pairs of elastic pieces; and
   pairs of elastic pieces extend in opposite directions to each other from the body.

8. The battery box structure according to claim 7, wherein each of the elastic pieces which makes a pair is opposed and extended to a position piled on top of each other.

9. The battery box structure according to claim 4, wherein:
   the air induction member includes a plate-shape body which forms the openings, and a protrusion having an air guide surface which protrudes from a vicinity of the opening of the body toward the battery module and guides air;

the air induction member circulates air introduced into the case along the body of the air induction member; and the air guide surface inclines so that a proximal end thereof is positioned higher than a distal end thereof in a direction of air circulation.

10. The battery box structure according to claim 4, further comprising:

a jointed portion which is formed near a cathode or an anode of the battery module; and a joining portion which is formed at least one of the air induction member and the holding frame, the joining portion being joined to the jointed portion.

11. The battery box structure according to claim 1, further comprising:

a holder which holds the battery module wherein a circular protrusion for positioning is formed at a periphery of the battery module; and a circular groove is formed at least one of the holder or the holding frame and joined to the circular protrusion.

12. The battery box structure according to claim 11, wherein:

the battery module has a plurality of single cells which are connected in series;

each of the single cells has an outer tube; and a holding portion which holds the outer tube in the vicinity of the circular groove when the circular protrusion and the circular groove are jointed.

13. The battery box structure according to claim 1, further comprising a positioning portion which is provided on at least one of the case or on an exterior member covering the case and decides a relative position in a plurality of directions.

14. The battery box structure according to claim 1, further comprising a restrainer which restrains movement of the holding frame separated from the case formed in at least one of the case and the holding frame.

15. The battery box structure according to claim 1, wherein a draining hole which faces the holding frame is formed on the case.

16. The battery box structure according to claim 1, wherein the elastic member extends between both ends of the holding frame.

17. The battery box structure according to claim 1, wherein both side edges of the upper wall of the elastic member are in contact with both corners of the holding frame.

* * * * *